INVENTOR
JOHN J. FANNON, JR.

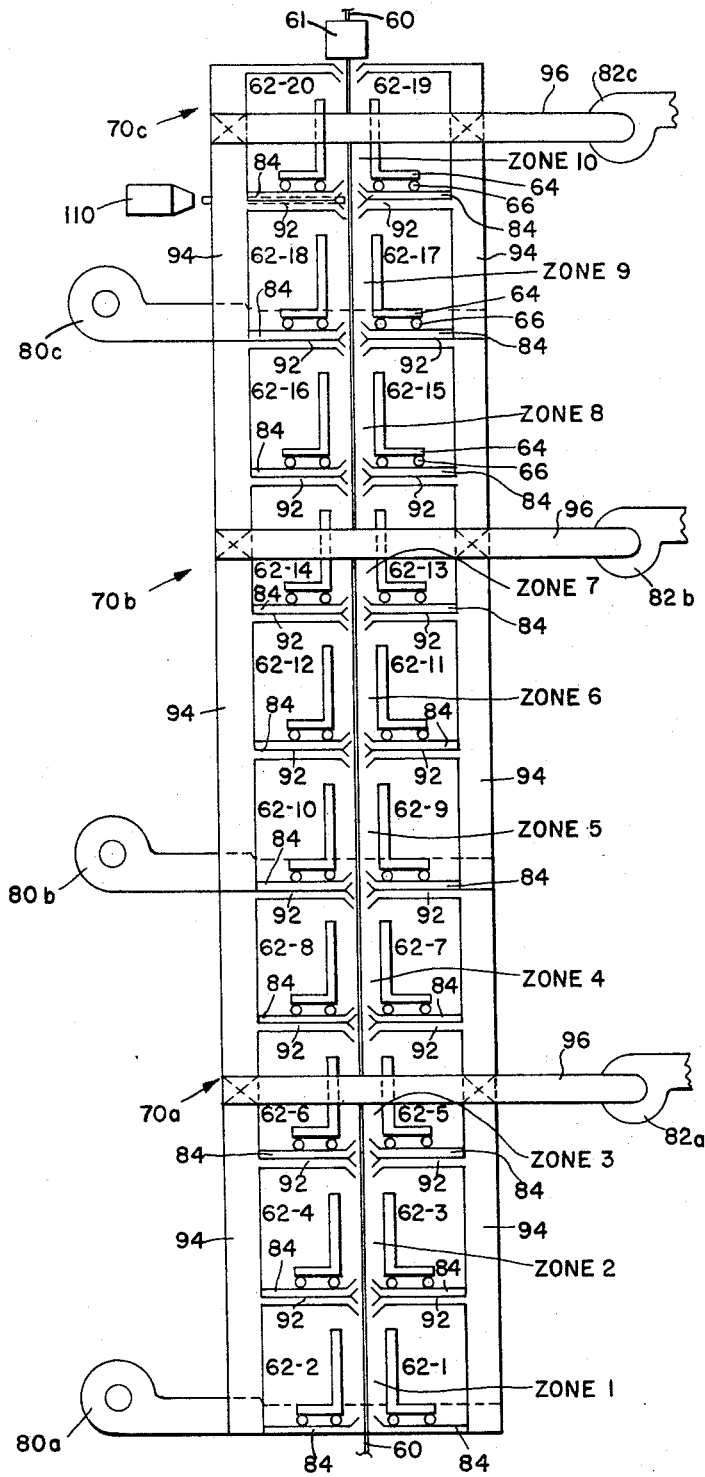

INVENTOR
JOHN J. FANNON, JR.

Oct. 22, 1968    J. J. FANNON, JR    3,406,954
APPARATUS FOR WEB DRYING
Filed July 6, 1966    30 Sheets-Sheet 4

INVENTOR
JOHN J. FANNON, JR.

BY
Strauch, Nolan, Neale, Nies & Bronaugh
ATTORNEYS

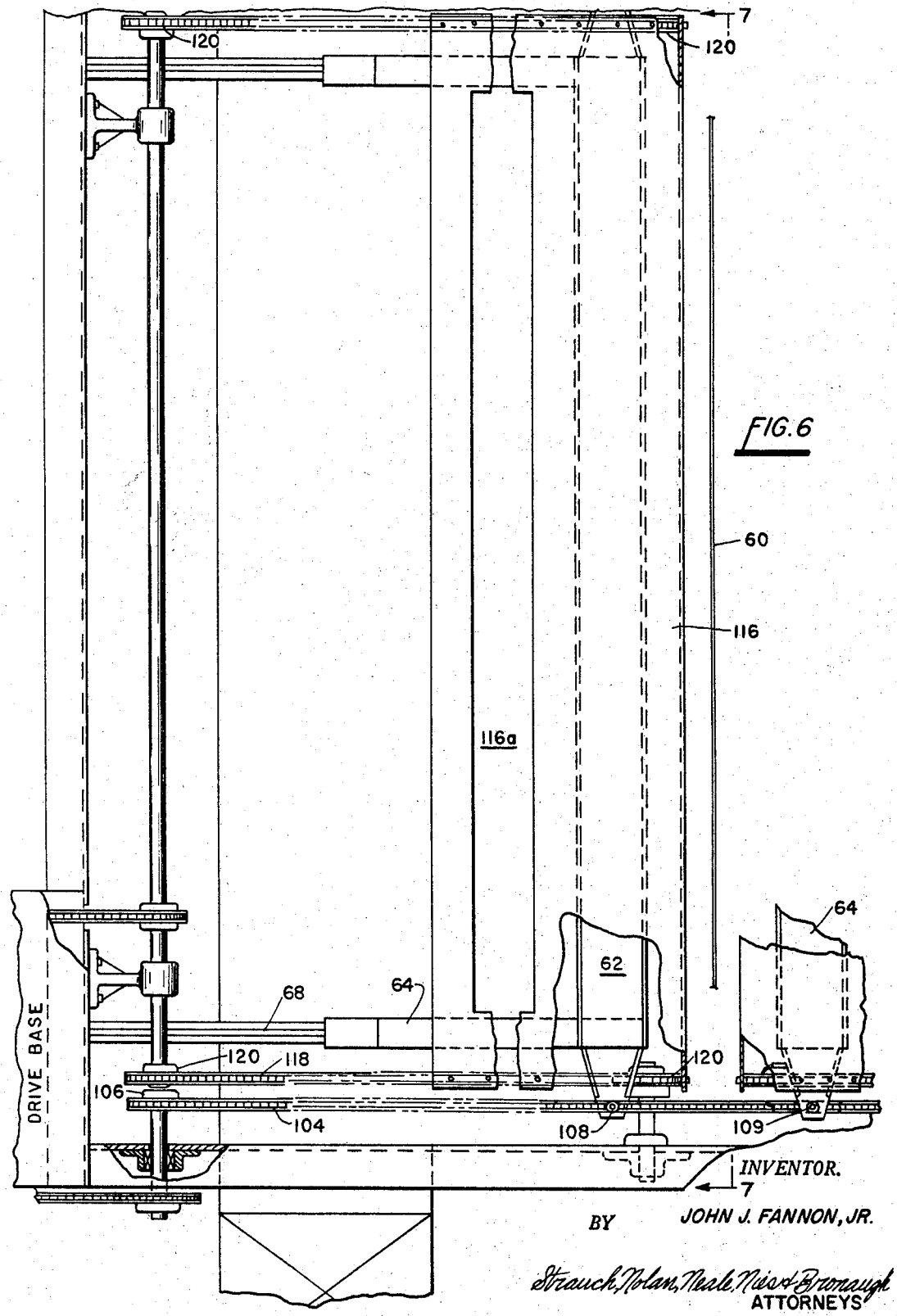

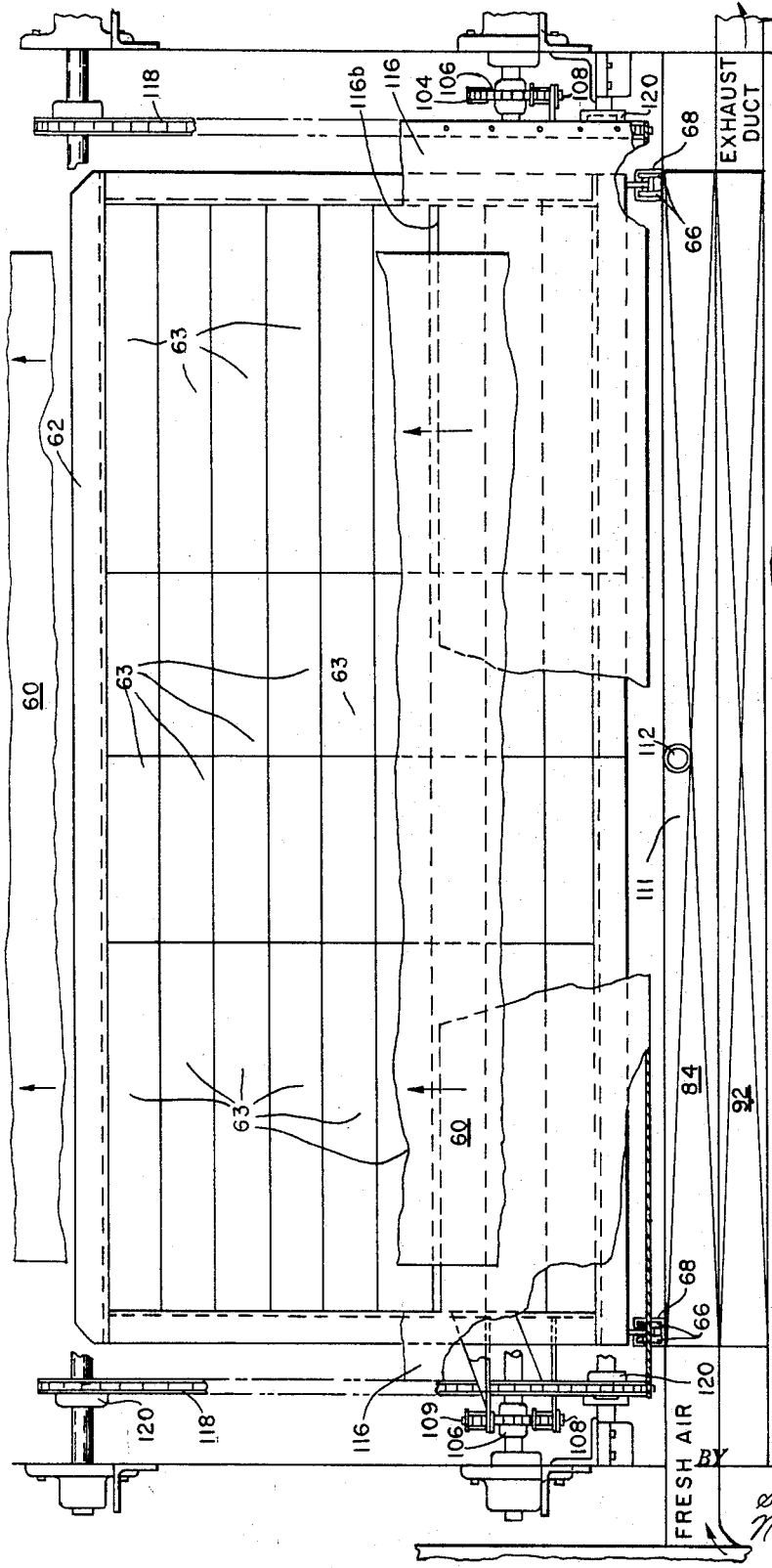

INVENTOR.
JOHN J. FANNON, JR.

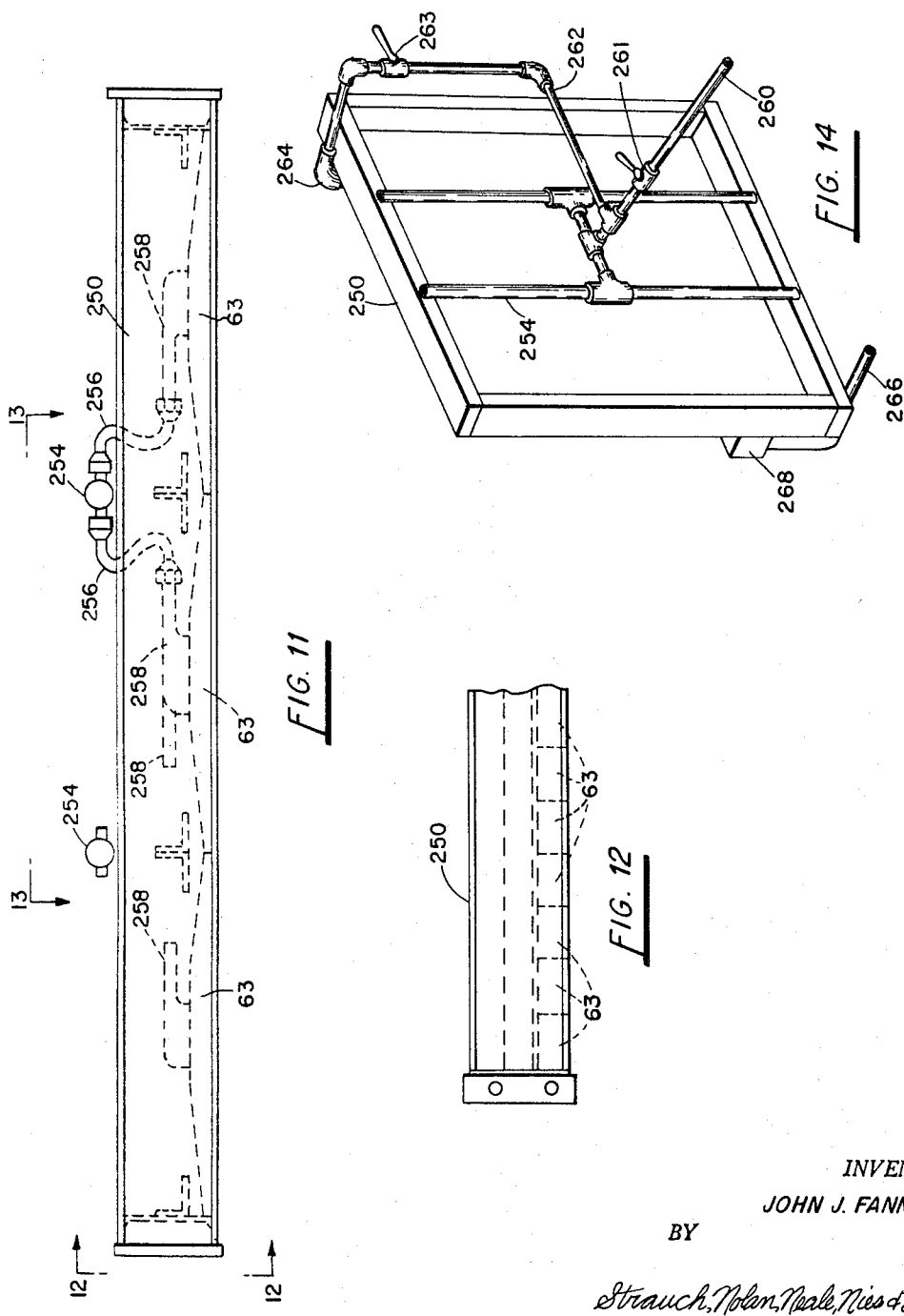

Oct. 22, 1968 J. J. FANNON, JR 3,406,954
APPARATUS FOR WEB DRYING
Filed July 6, 1966 30 Sheets-Sheet 11

INVENTOR.
JOHN J. FANNON, JR.
BY
Strauch, Nolan, Neale, Nies & Bromugh
ATTORNEYS

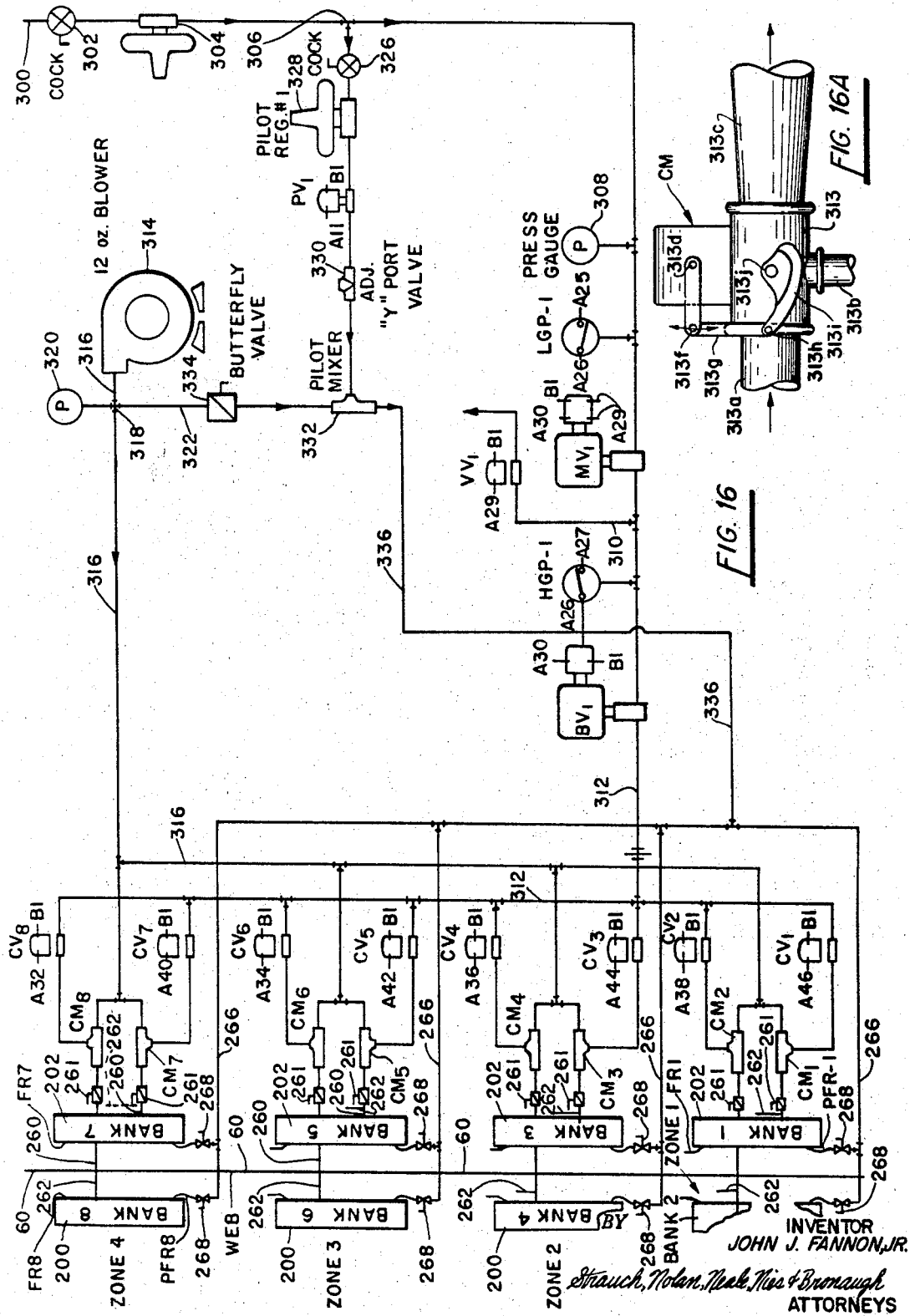

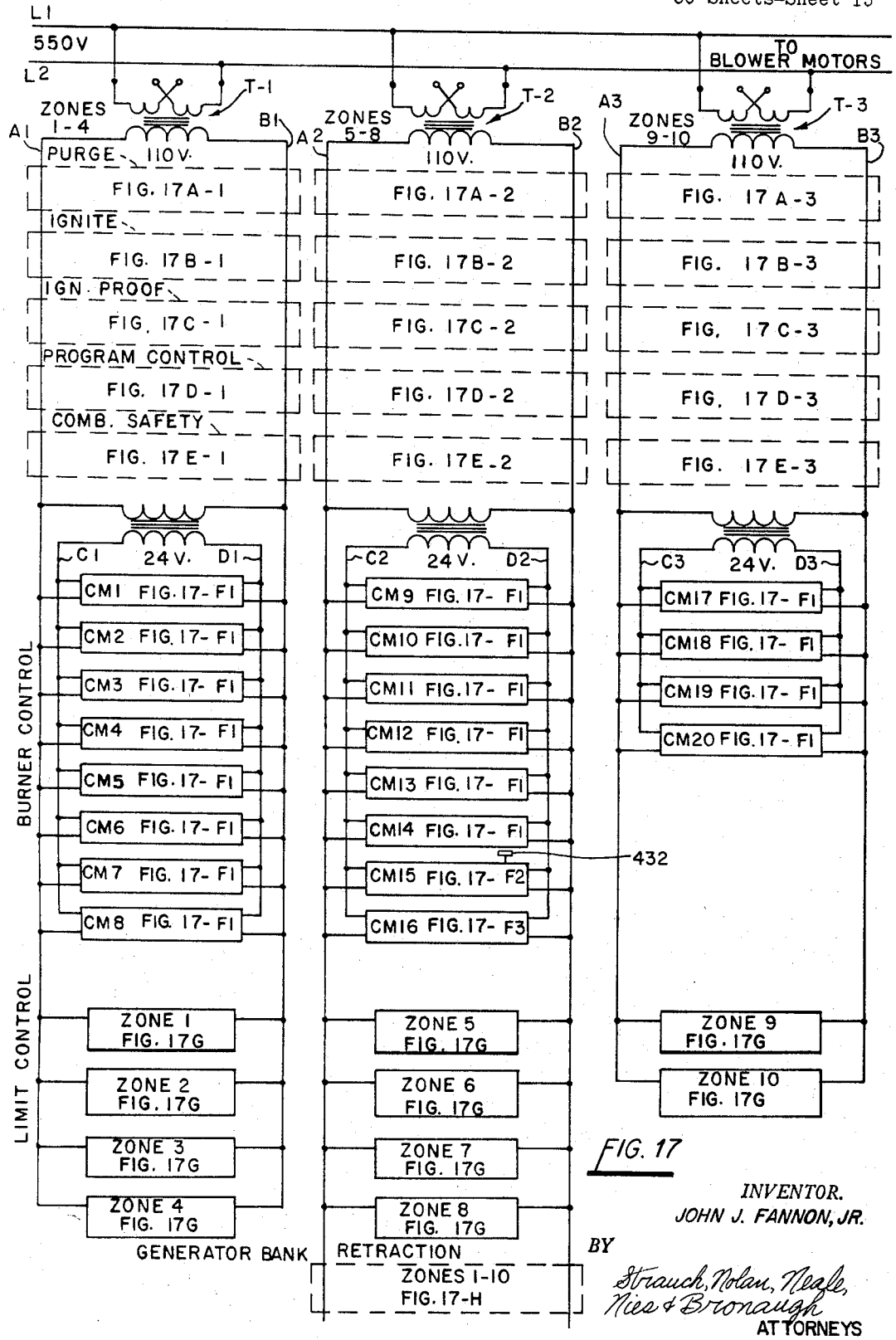

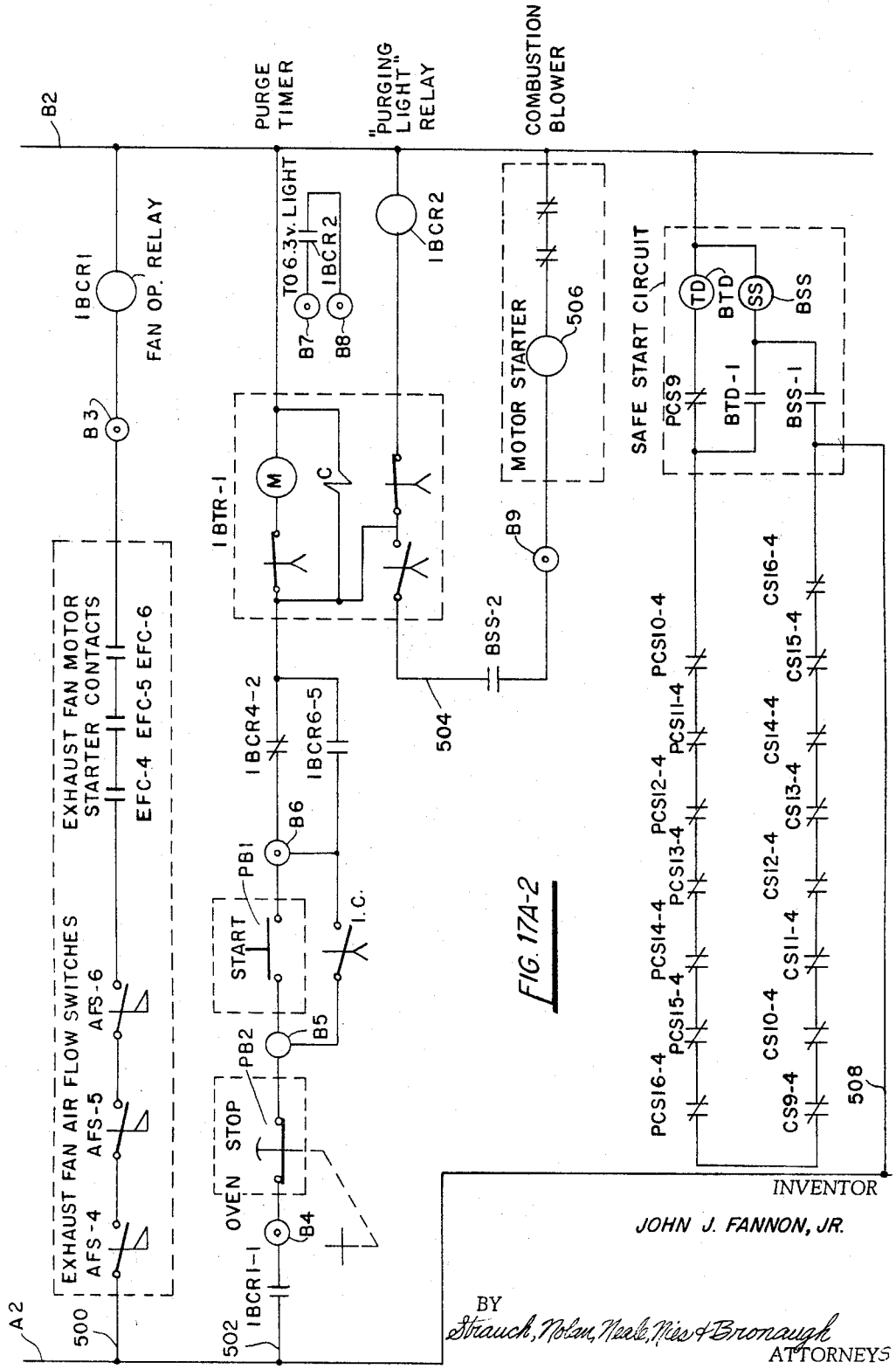

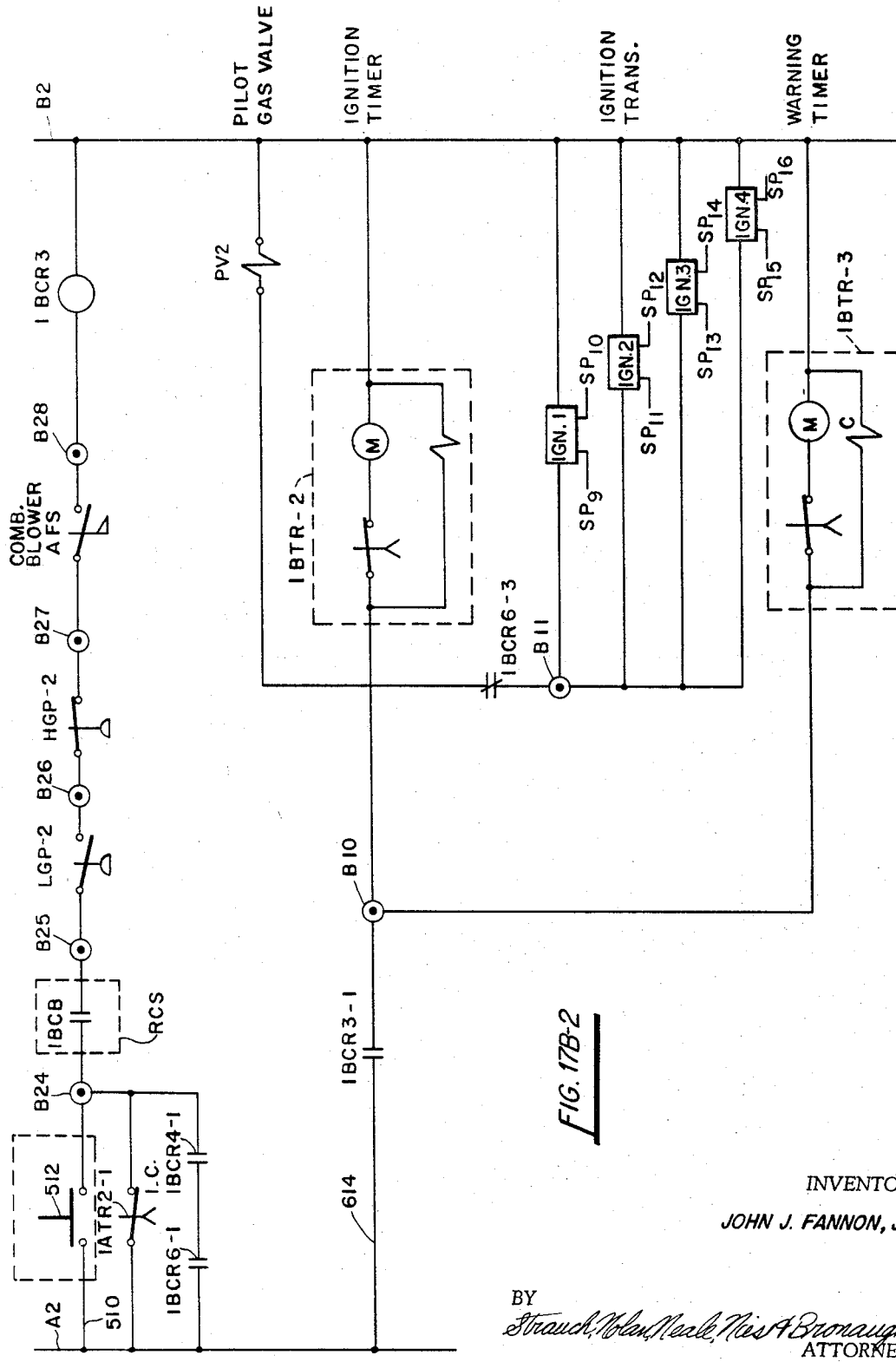

INVENTOR
JOHN J. FANNON, JR.

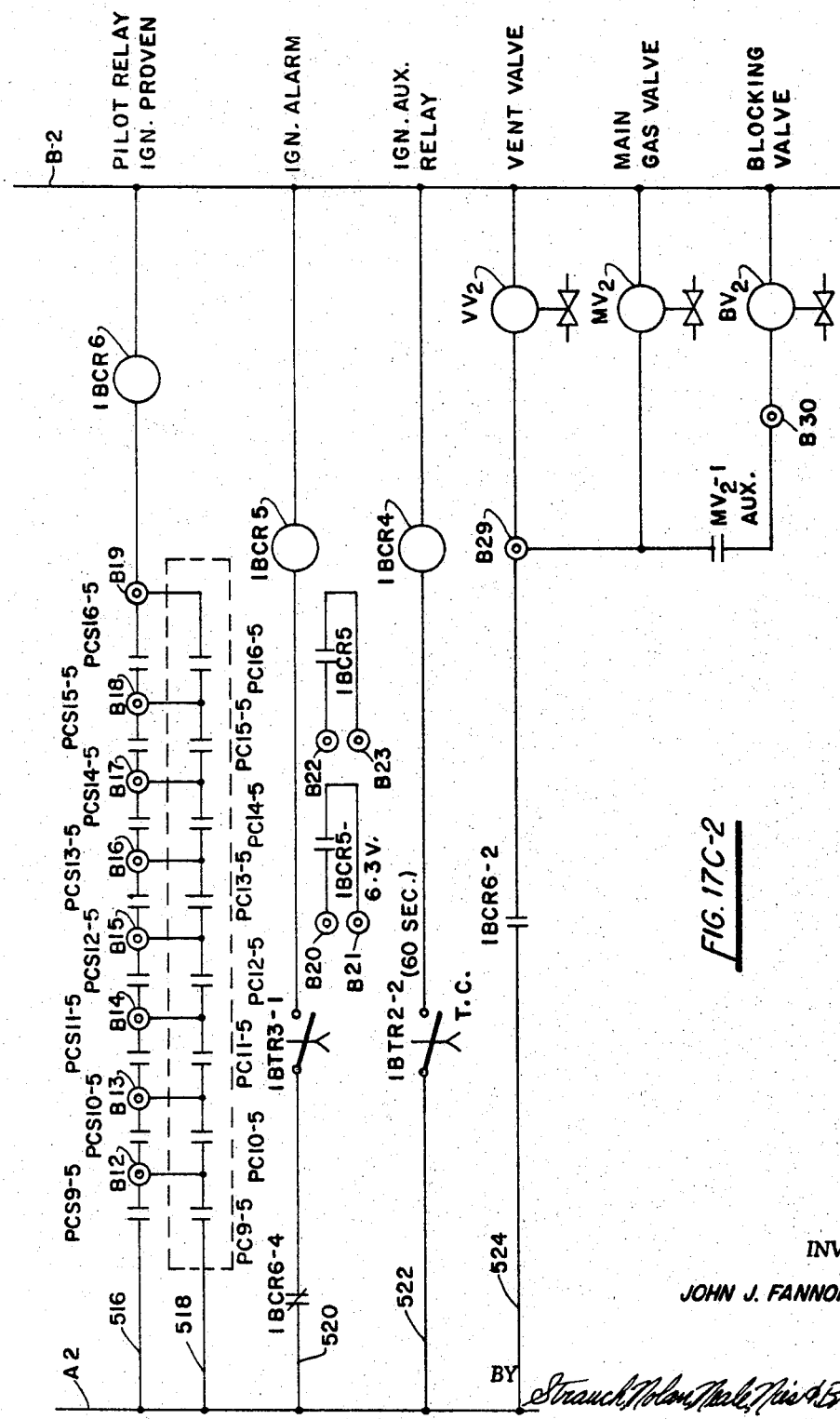

INVENTOR
JOHN J. FANNON, JR.

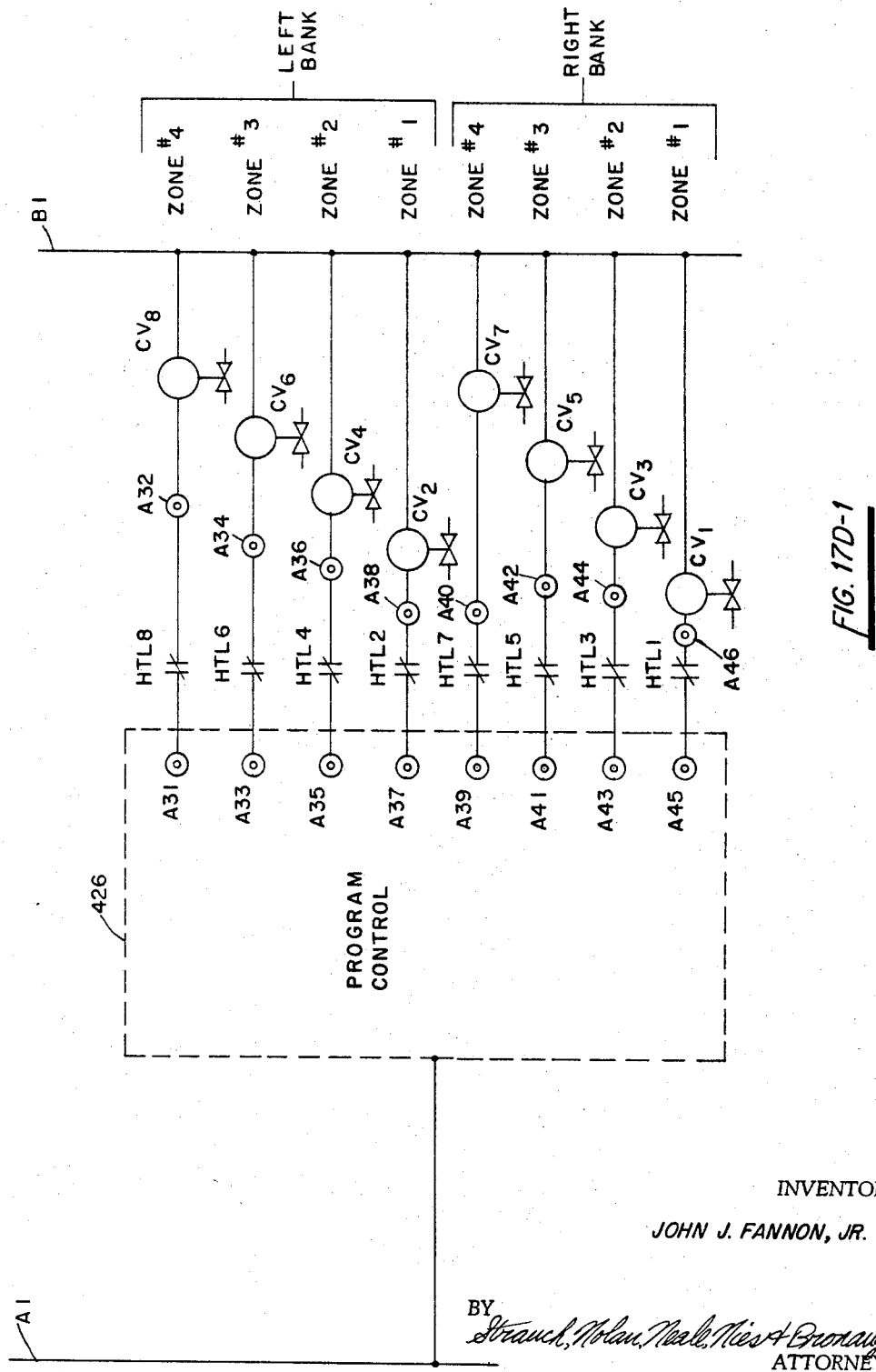

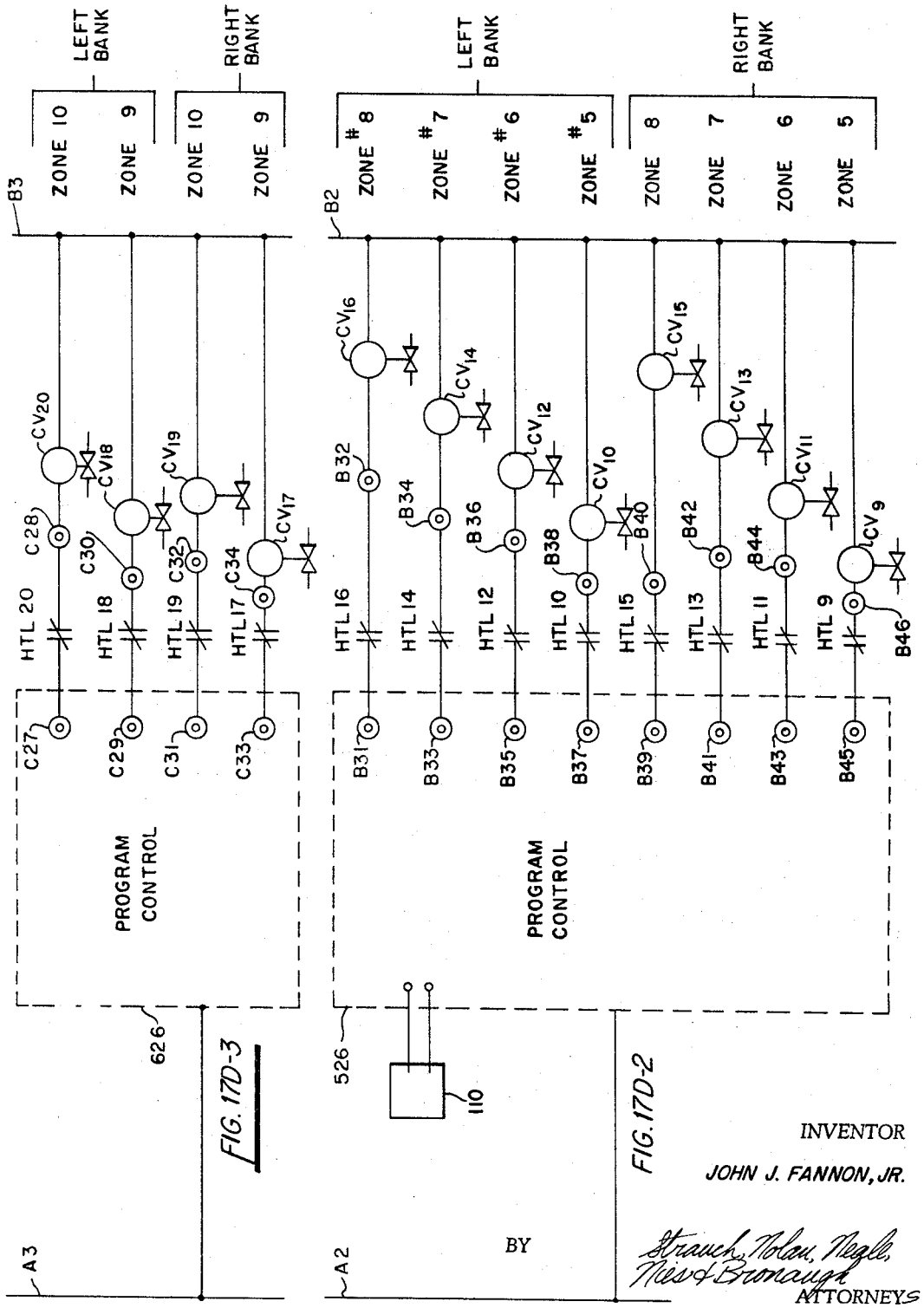

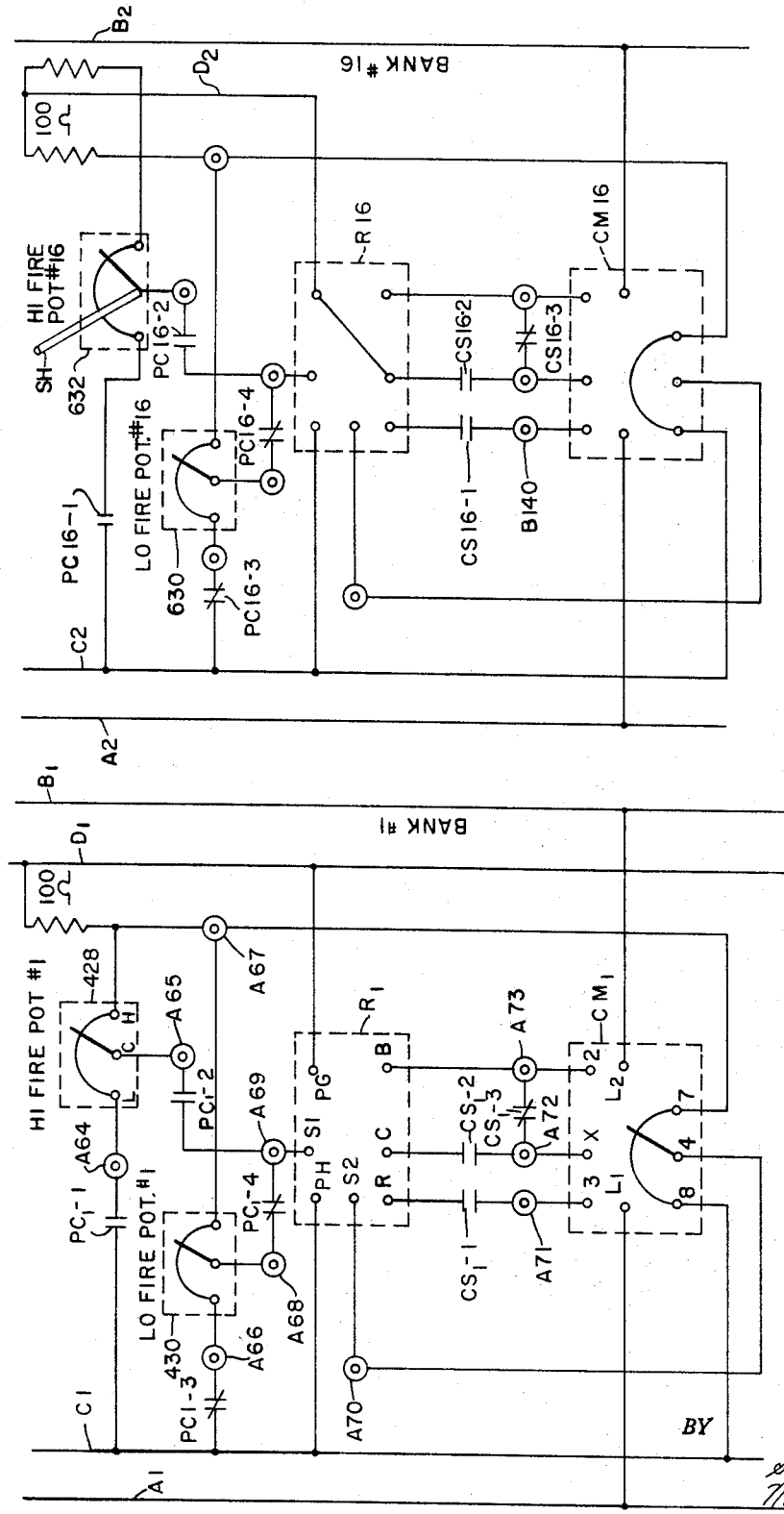

Oct. 22, 1968  J. J. FANNON, JR  3,406,954
APPARATUS FOR WEB DRYING
Filed July 6, 1966  30 Sheets-Sheet 29

BANK 15

INVENTOR
JOHN J. FANNON, JR.

BY
Strauch, Nolan, Neale, Nies & Bronaugh
ATTORNEYS

United States Patent Office 3,406,954
Patented Oct. 22, 1968

3,406,954
APPARATUS FOR WEB DRYING
John J. Fannon, Jr., Grosse Pointe Park, Mich., assignor, by mesne assignments, to Fostoria-Fannon, Inc., a corporation of Ohio
Filed July 6, 1966, Ser. No. 563,286
23 Claims. (Cl. 263—3)

ABSTRACT OF THE DISCLOSURE

An infrared radiating apparatus or oven for a material such as a web which moves along a predetermined path by one or between a pair of irradiating means which are arranged in a bank or banks and which banks may be arranged to define zones in the oven. The bank or banks are directly movable on tracks toward and away from the path of movement of the material being irradiated. Means are provided responsive to the rate of movement of the material and/or the temperature of the material, for reducing the radiation of the irradiating means by (1) moving the bank or banks of irradiating means away from the material, (2) reducing, including cutting off, the heat input to the irradiating means, (3) moving an interceptor such as a shutter or shutters between irradiating means and the material, and/or (4) subjecting the material to a fluid cooling medium such as a stream of air between the irradiating means and the material. This cooling medium also may be used for purging the apparatus or oven, and the irradiating means may be gas fired and include ignition detecting means.

---

This invention covers a process and apparatus for drying fabrics. Specifically it has its primary application in the rubber industry, where the fabric is impregnated with a dissolved coating material which must be dried rapidly without being heated to a temperature in excess of a specific value, for example 350° F.

The fabric is generally in the form of a continuous web which moves in a vertical plane from a lower floor where the coating is applied through upper floors where the process of the present invention is carried on by the apparatus to be described to a floor above, where subsequent operations take place.

The process of the present invention comprises moving the web between facing gas-fired infrared generators in a plurality of vertical banks either with or without curtains of rapidly moving air at relatively low temperatures on both sides of the web between it and the generators, with temperature control means to hold the web temperature below a predetermined maximum value, along with safety controls to ensure safe starting and safe operation. The generators may be of one of the types disclosed in co-pending application Ser. No. 50,421 filed Aug. 18, 1960 by John J. Fannon, Jr. for "Heating Apparatus and Method," now Patent No. 3,228,113 issued on Jan. 1, 1966.

The principal object of the present invention is to provide means to heat a web of impregnated fabric in such manner as to cure the impregnated compound rapidly but without damage by excessive heat, regardless of the speed at which the web is moving, including starting and shut down.

In the preferred form of the invention this object is attained by provision of:

(a) A plurality of successive heating zones through which the web passes, with infrared generators providing radiant energy which impinges on both sides of the web in each zone;

(b) control means for the generators in at least one zone which reduces the radiant energy when the web reaches a predetermined optimum curing temperature;

(c) means to reduce the radiant energy rapidly when web motion ceases, by cutting off fuel, retracting the generators from proximity to the web and wiping the surface of the web with a stream of cooling air; and (d) means to program the operation of the generators when the web starts, to proportion the radiation to the web speed.

The foregoing and other objects of this invention will become more fully apparent by reference to the appended claims and as the following detailed description proceeds in reference to the accompanying drawings wherein:

FIGURE 2 is a schematic vertical view of an oven structure incorporating a second form of the invention;

FIGURE 6 is a horizontal section taken on line 6—6 of FIGURE 5;

FIGURE 7 is an elevation looking from line 7—7 of FIGURE 6, showing one of the infrared generator banks;

FIGURE 11 is a bottom edge view of the bank shown in FIGURE 10 looking from line 11—11;

FIGURE 12 is a side view of a corner of the bank of FIGURE 10 looking from line 12—12 of FIGURE 11;

FIGURE 14 is a perspective view of the gas connections to the typical generator bank shown in FIGURE 10;

FIGURE 16 is a piping diagram showing gas and air connections to a four zone unit, constituting the lower four zones of the oven of FIGURE 2 for example;

FIGURE 16A is a diagrammatic illustration of one of the multi-ratio mixers CM1–CM20;

FIGURE 17 is a block diagram of the electric control circuit for the apparatus; and FIGURES 17A–1, 17A–2, 17A–3, 17B–1, 17B–2, 17B–3, 17C–1, 17C–2, 17C–3, 17D–1, 17D–2, 17D–3, 17E–1, 17E–2, 17E–3, 17F–1, 17F–2, 17F–3, 17G and 17H show circuits within the blocks of FIGURE 17.

The apparatus incorporates means to move the web upward at high speed, pairs of gas-fired infrared generators (each pair comprising a generator on each side of the web, and facing it), means for moving cooling air upwardly between the generators and the surfaces of the web to remove the volatiles given up by the web or to prevent overheating of the web in the event of web stoppage, means for withdrawing the air from the vicinity of the web before it becomes too hot to keep the web cool or saturated with the volatiles, temperature sensing means for sensing the temperature of the moving web near its upper end, temperature control means for controlling the input to certain of the generators in response to said temperature sensing means, positioning means for adjusting the distance between the infrared generating means and said web and heat reduction means for rapidly reducing heat transfer to the web in case of stoppage of the web or other emergency.

The heat reduction means may comprise:

(a) means for moving the radiant surfaces rapidly away from the web, and/or
(b) means for interposing air and/or opaque curtains between the radiant surfaces and the web.

The input to the generators may also be reduced or terminated simultaneously with (a) or (b) but reducing or terminating input alone will not lower the heat transfer to the web fast enough to prevent damage to the web in case it stops.

*First form*

Figure 1:
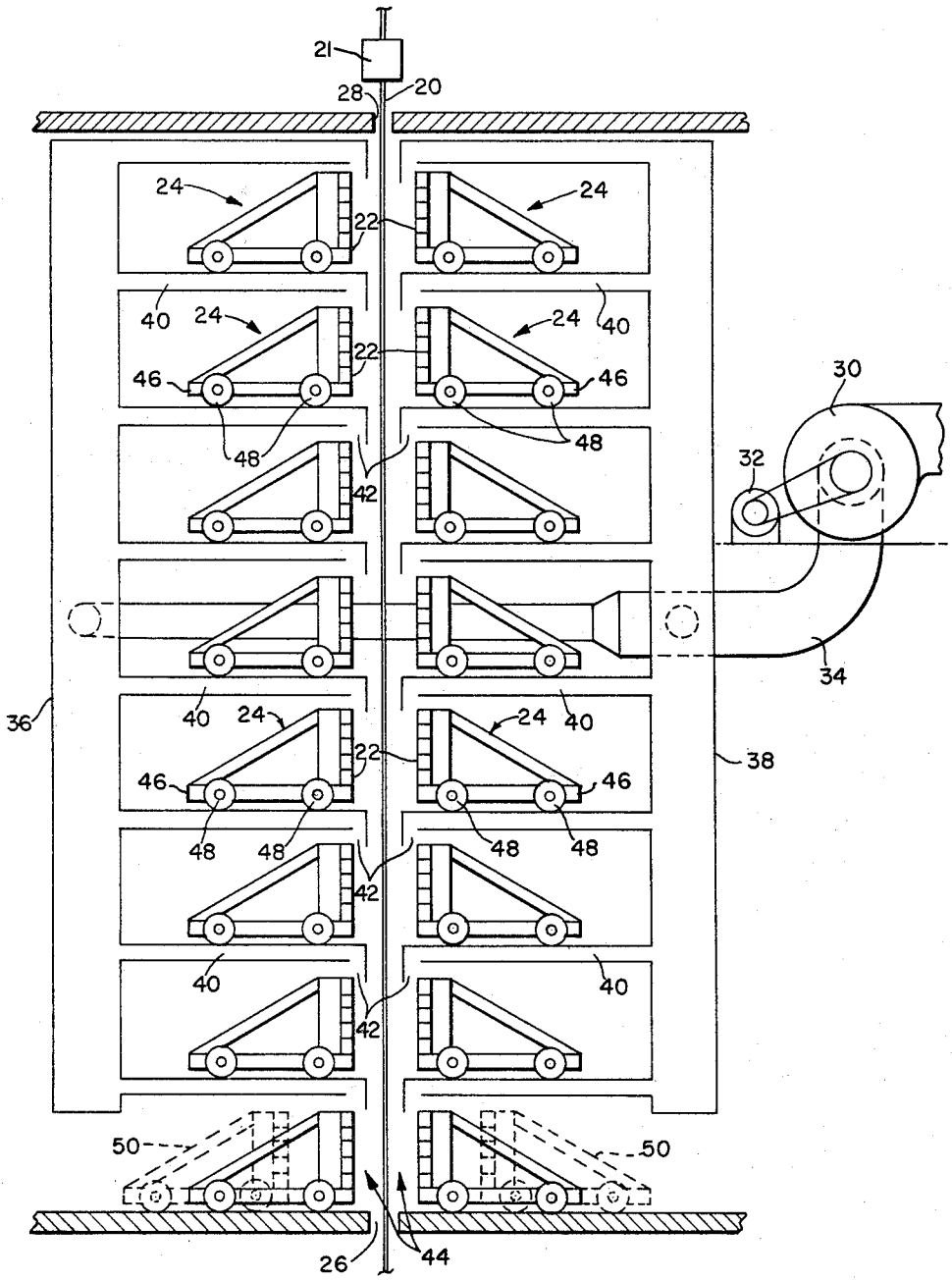
FIGURE 1 is a schematic vertical view of an oven structure incorporating one form of the invention.

As shown in FIGURE 1, a web 20 of textile material, impregnated with coating material in a solvent is moved rapidly upwardly, such as by a driving means 21, between sixteen banks 22 of infrared generators 24, arranged in pairs, facing opposite sides of the web.

Web 20 passes through a slot 26 in the floor and a slot 28 in the ceiling of the room in which the apparatus is located.

An exhaust blower 30 driven by motor 32 is connected by duct 34 to vertical ducts 36 and 38 which are connected to branch ducts 40 above each of banks 22, ducts 40 terminating in openings 42 between web 20 and generators 24 at the top of each bank. This exhaust system evacuates volatiles and heated air from the region of the web 20.

The spaces between each pair of banks constitutes a heating zone 44, the sixteen banks forming eight such zones.

Each of the generator banks is mounted on a carriage 46 having rollers 48 which permit the bank to be moved with respect to web 20 so that in the closest position of the facing banks, sufficient heat is supplied to produce the desired drying effect, while in the position 50, most remote from web 20, the heat on web 20 is reduced to a value which will not damage the web even if it is not in motion. The effect may be augmented by adjusting or terminating the fuel supply to the burners at the same time as they are moved in or out, with maximum heat intensity in the close position and minimum intensity or no heat when in the outer position.

Such movement may be either manual or automatic, automatic operation being especially desirable in case of stoppage of the web, to prevent damage to the fabric.

*Second form*

In the form of the invention shown in FIGURES 2–7, a web 60 travels upwardly, such as by a driving means 61 between banks 62–1 through 62–20 of infrared generators 63 (FIGURE 3), each bank being mounted on a carriage 64 equipped with rollers 66, the rollers 66 riding on tracks 68 supported by an oven structure 70. There are twenty banks providing ten heating zones between the pairs of facing banks, the oven comprising three independently controlled units 70a, 70b and 70c. Unit 70a incorporates zones 1 to 4, unit 70b zones 5 to 8 and unit 70c zones 9 and 10.

Figure 3:
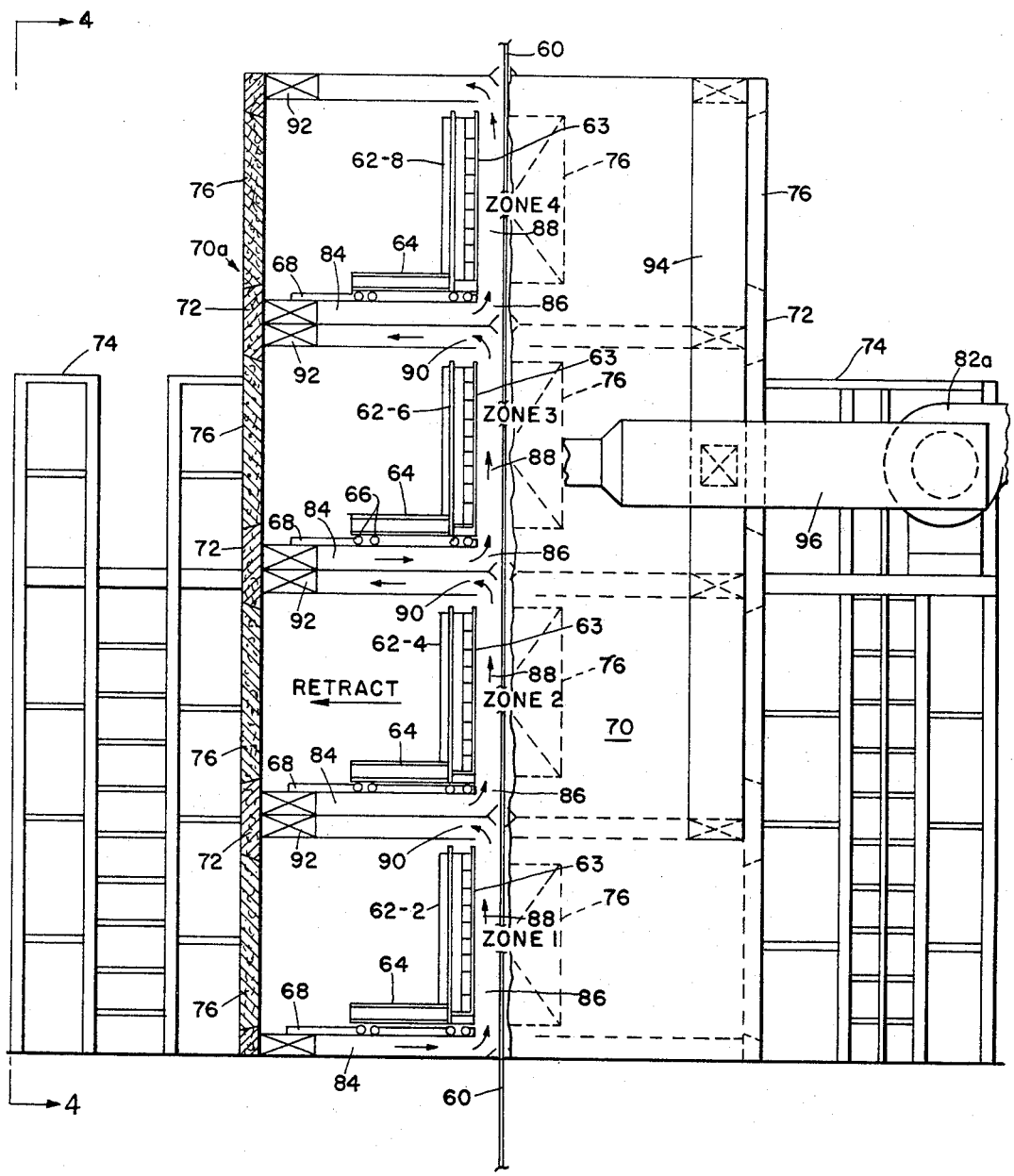
FIGURE 3 is an enlarged elevation, partly in section, of the lower portion of the structure shown in FIGURE 2.
Figure 4:
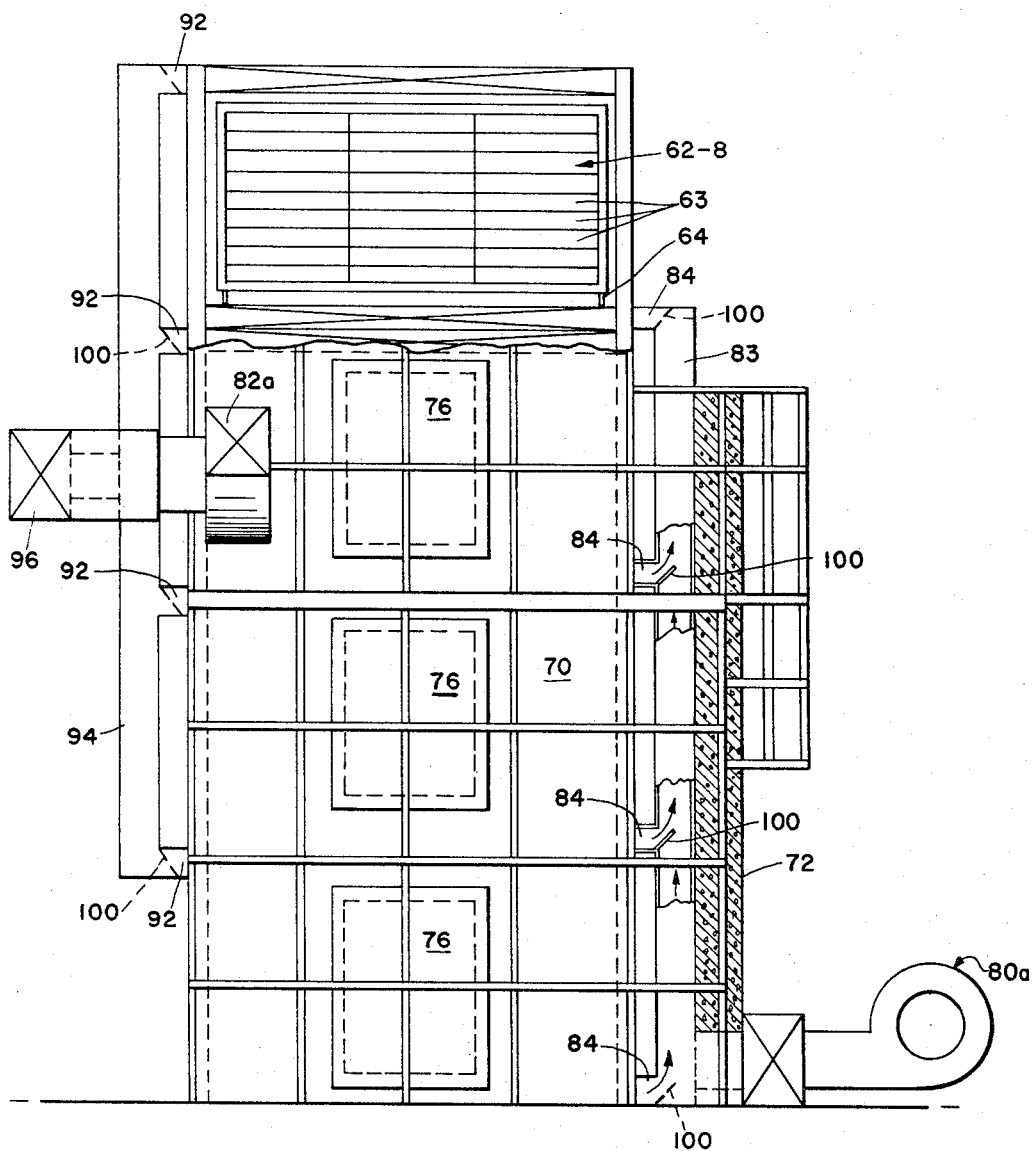
FIGURE 4 is another elevation (partially broken away) of the structure shown in FIGURE 3 looking from line 4—4 of FIGURE 3.
Figure 5:
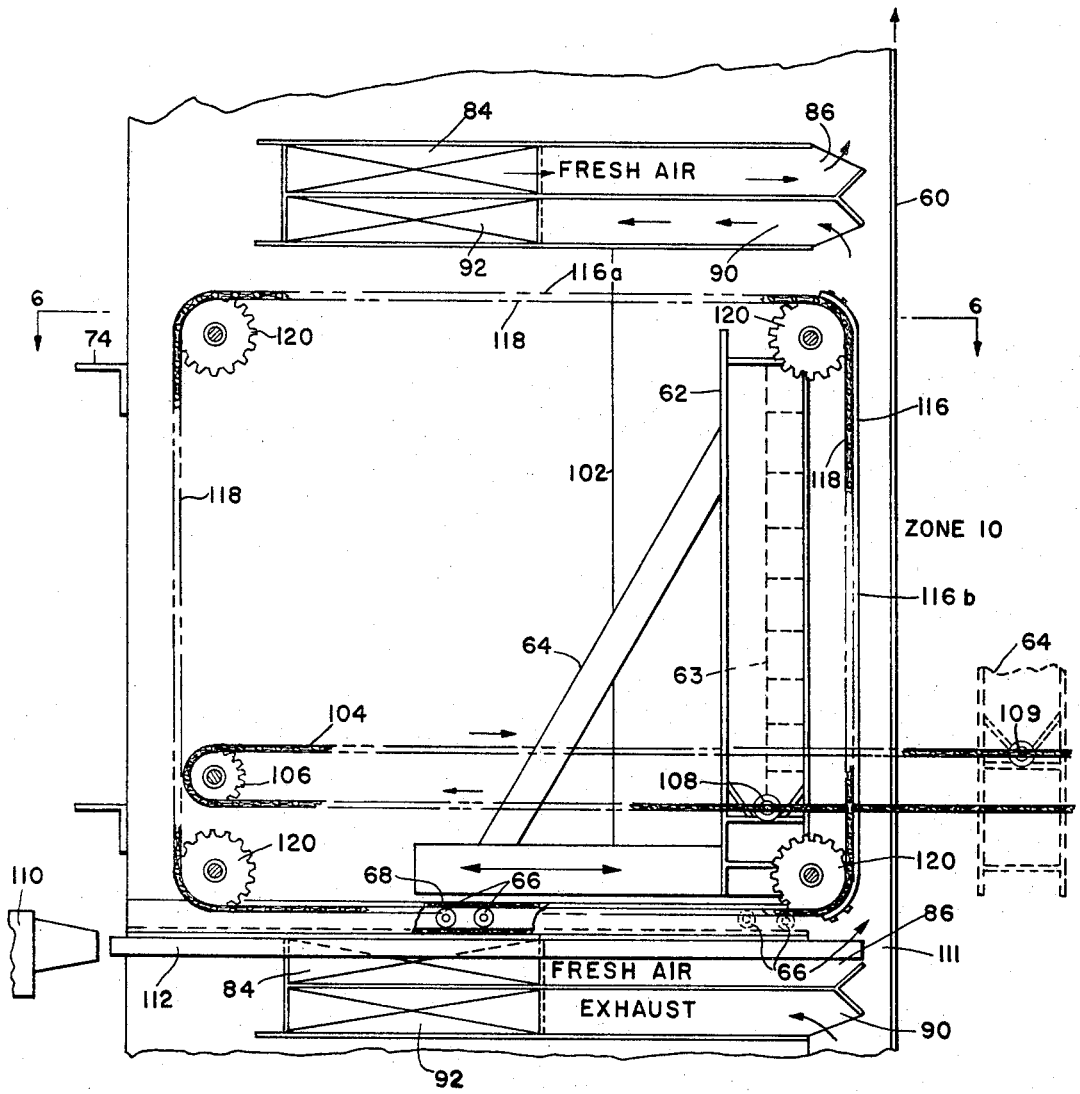
FIGURE 5 is an enlarged detail of the upper left-hand corner portion of FIGURE 2 illustrating the generator bank shifting and radiation interception structure of one embodiment of this invention.
Figures 1, 17A:
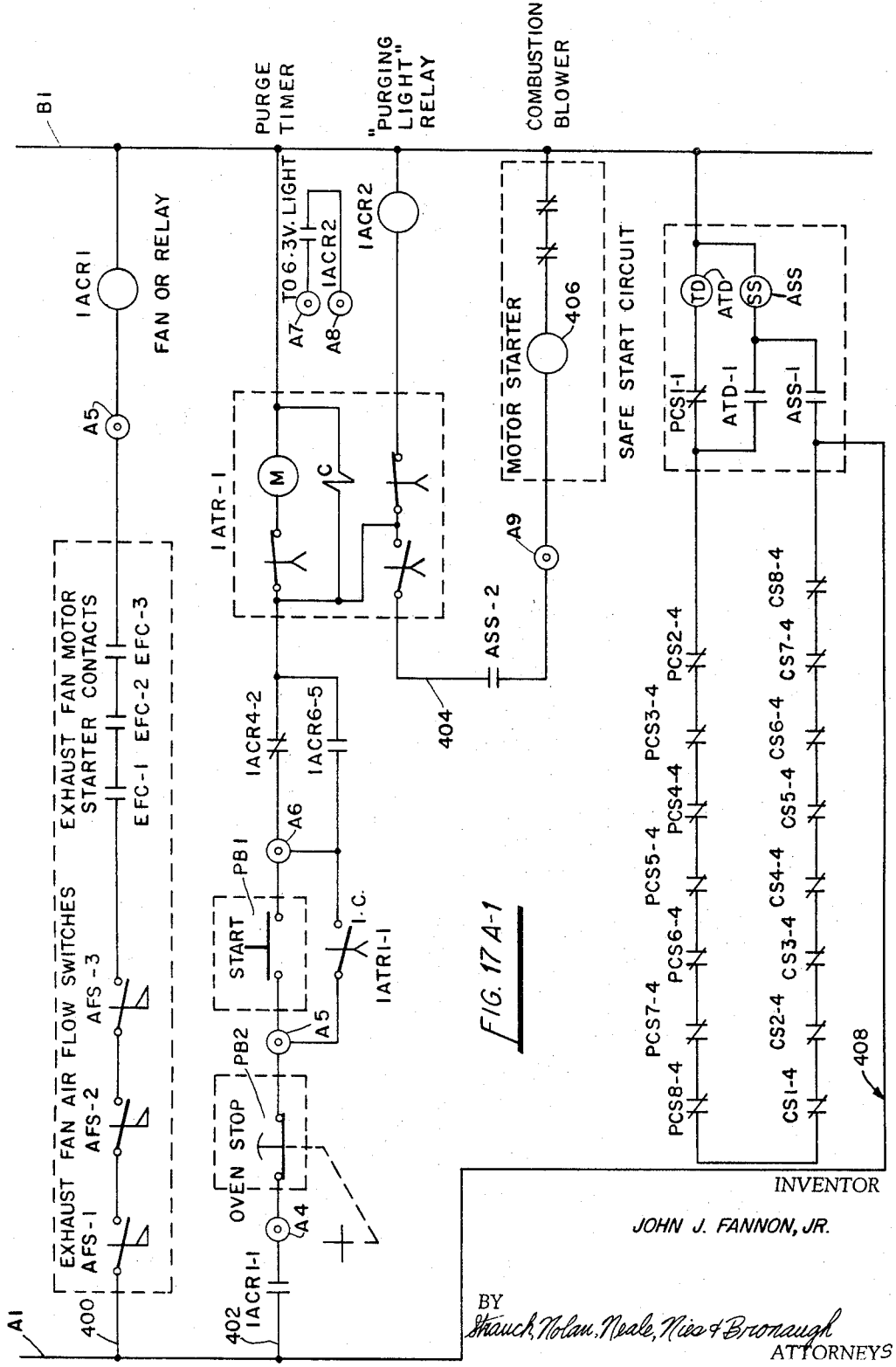
Figures 3, 17A:
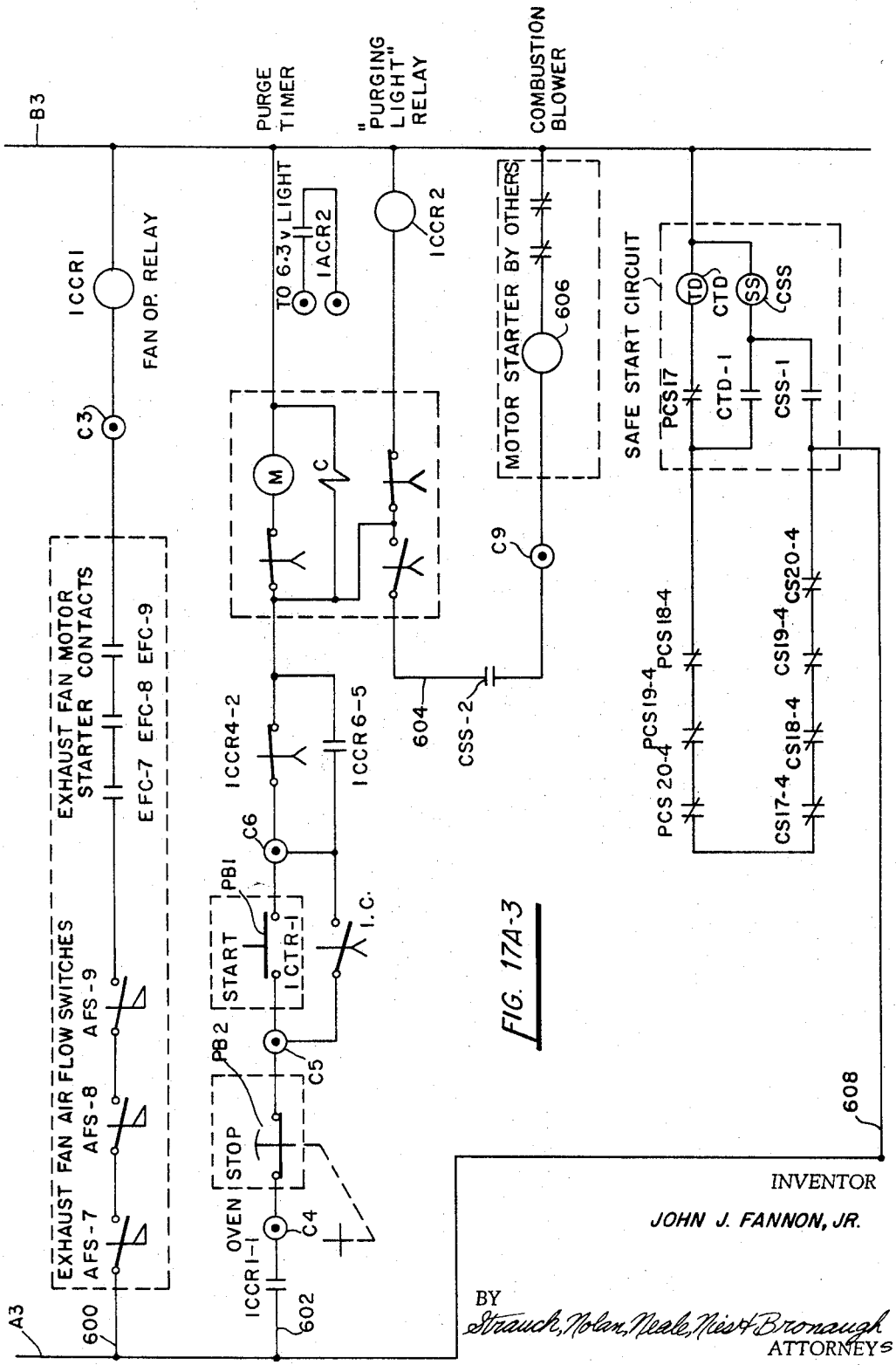
Figures 1, 17B:
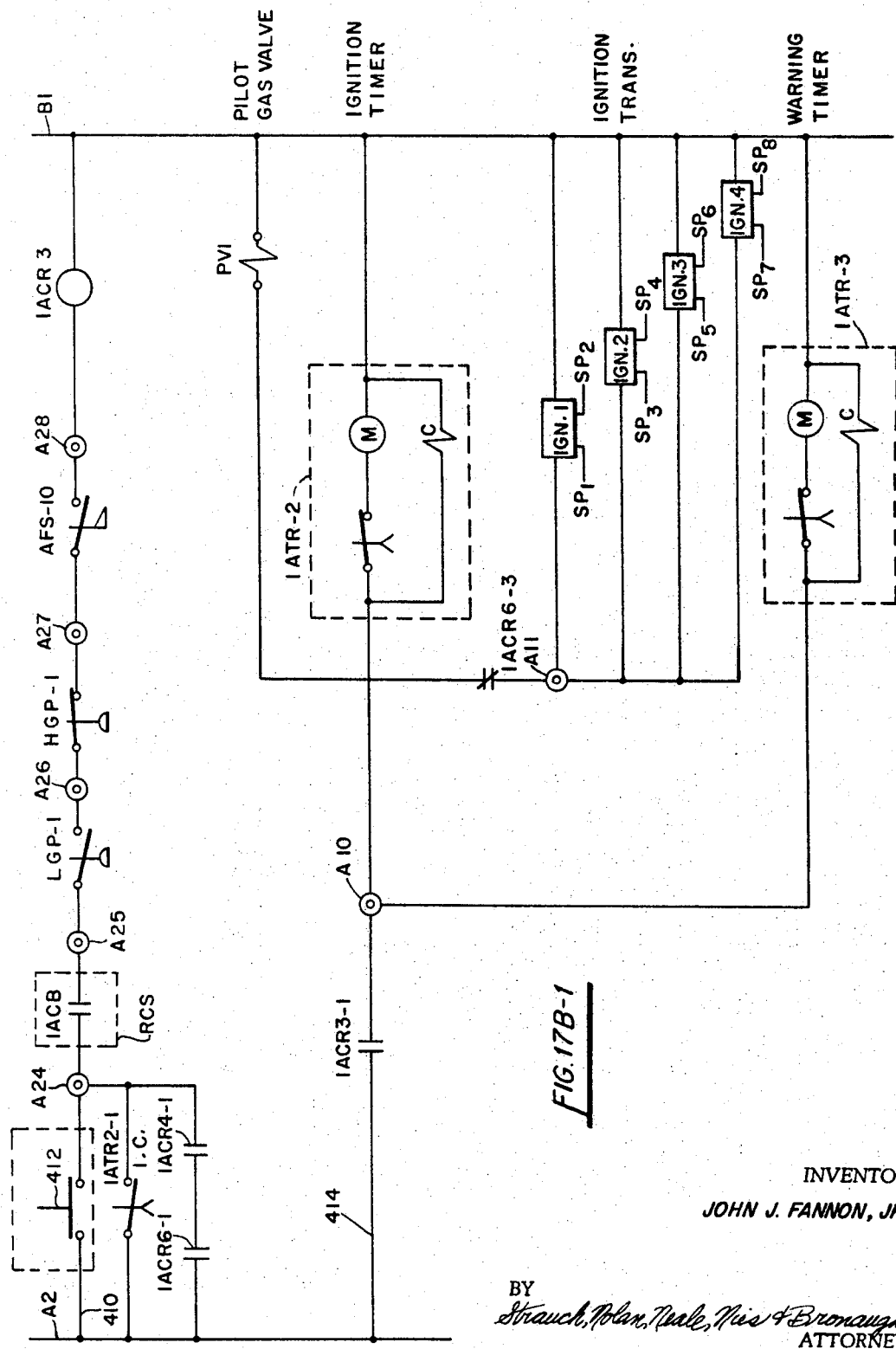
Figures 3, 17B:
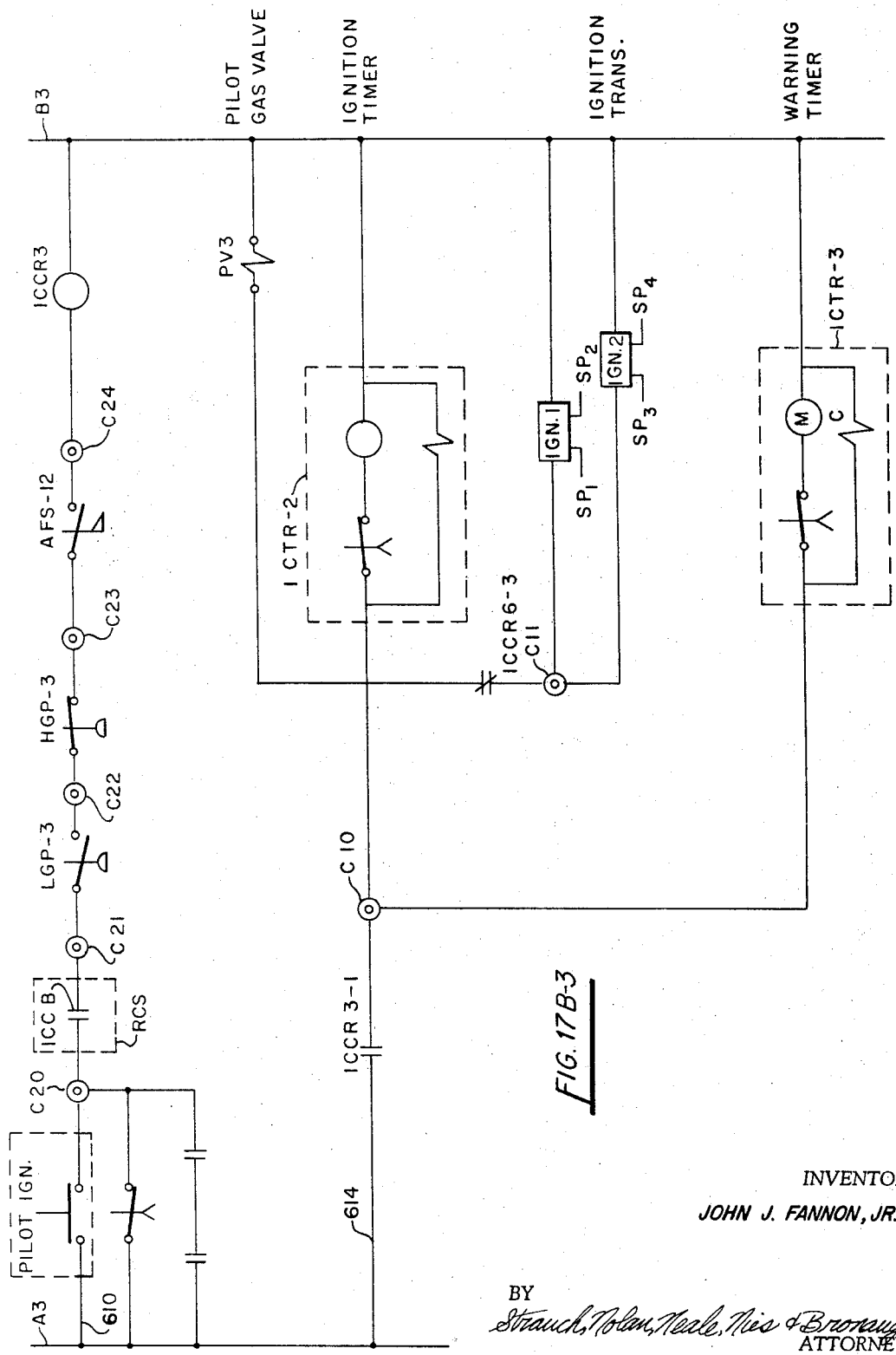
Figures 1, 17C:
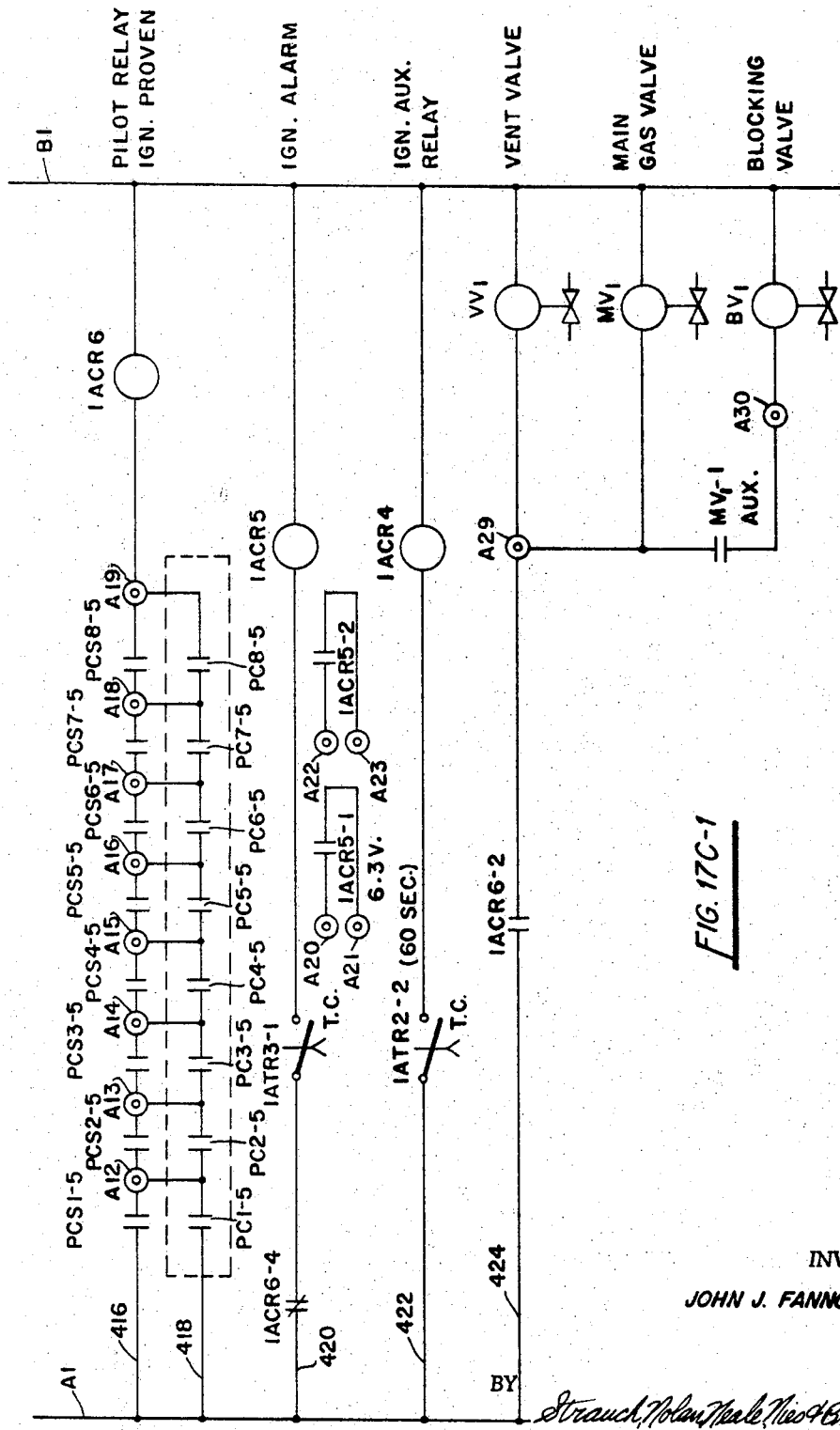
Figures 3, 17C:
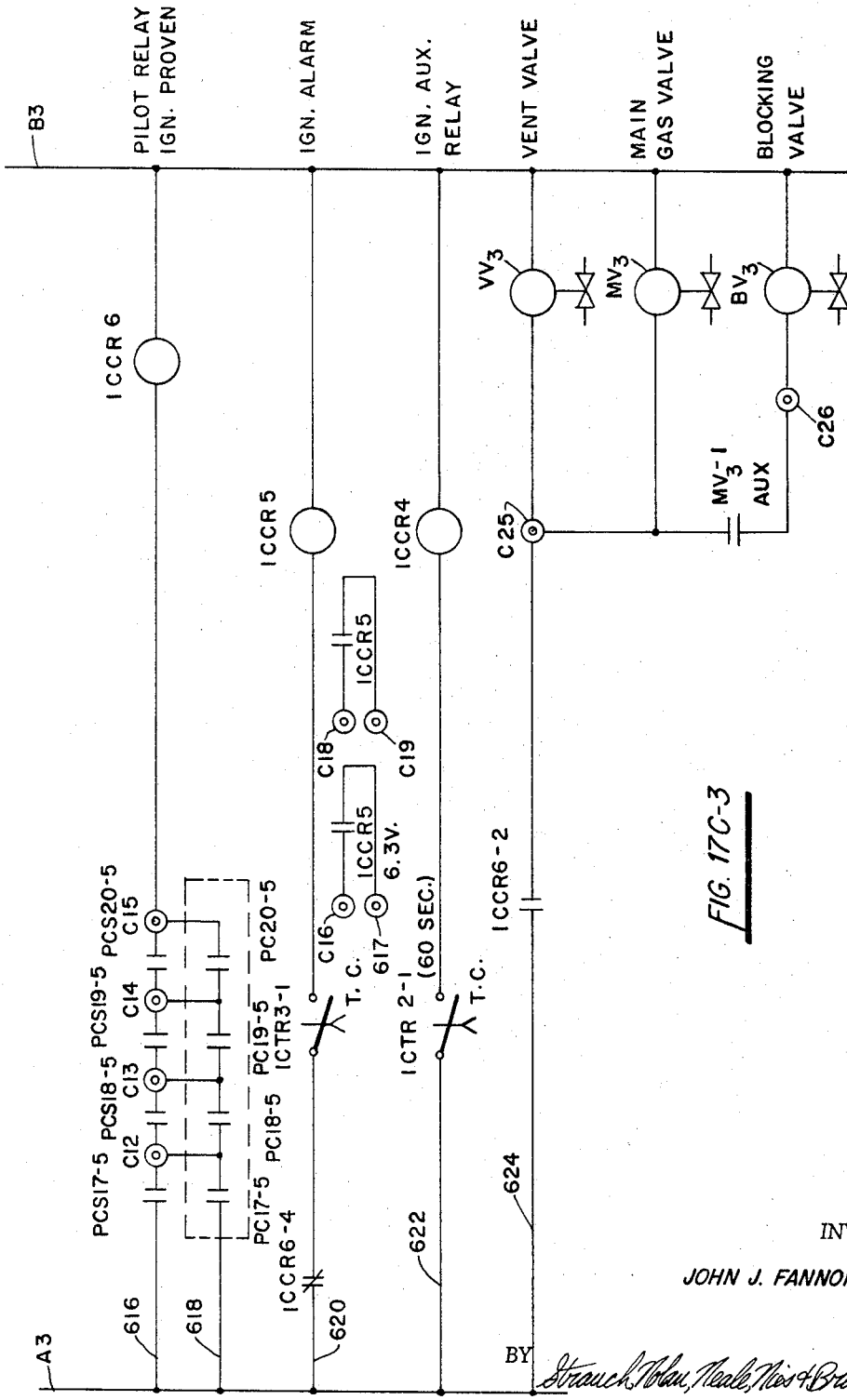
Figures 1, 17E:
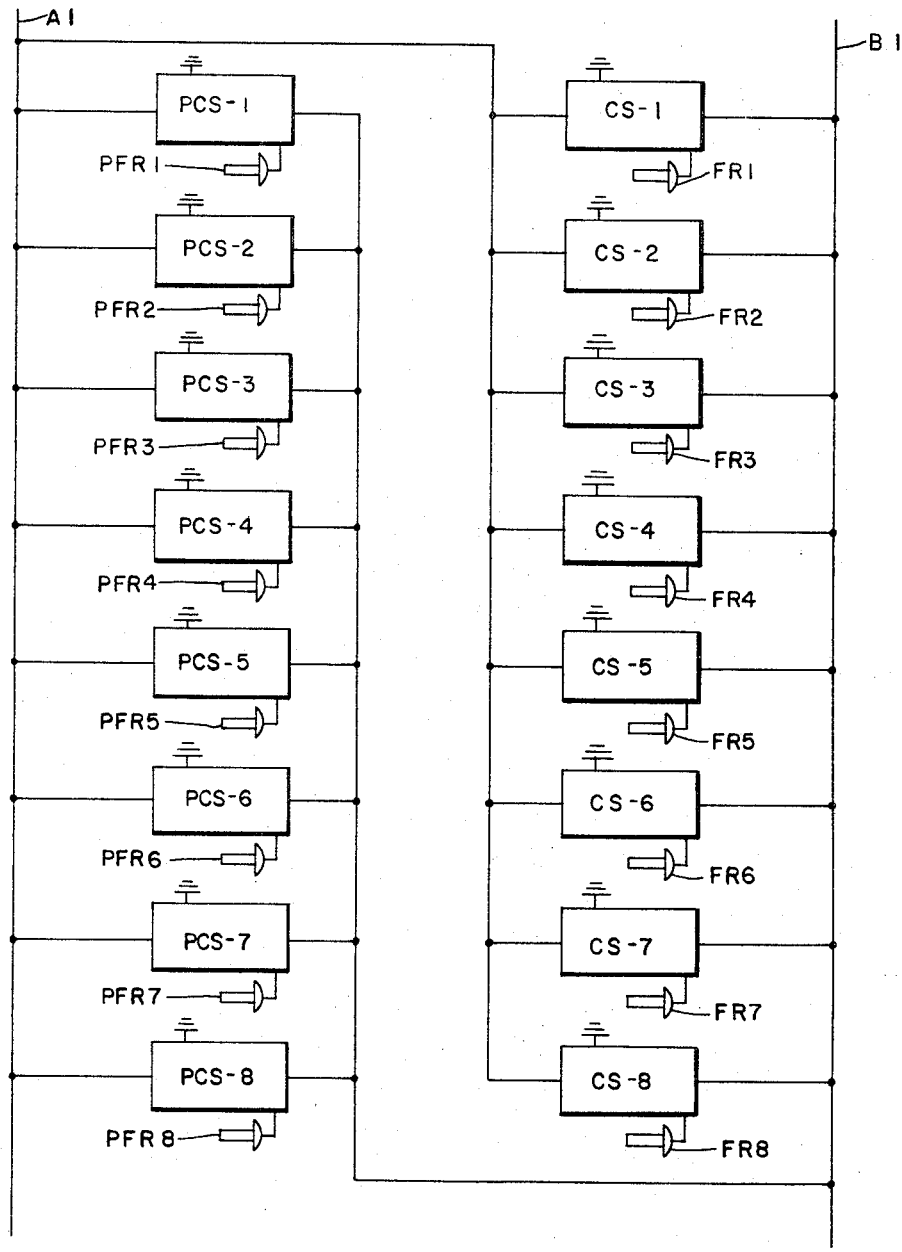
Figures 2, 17E:
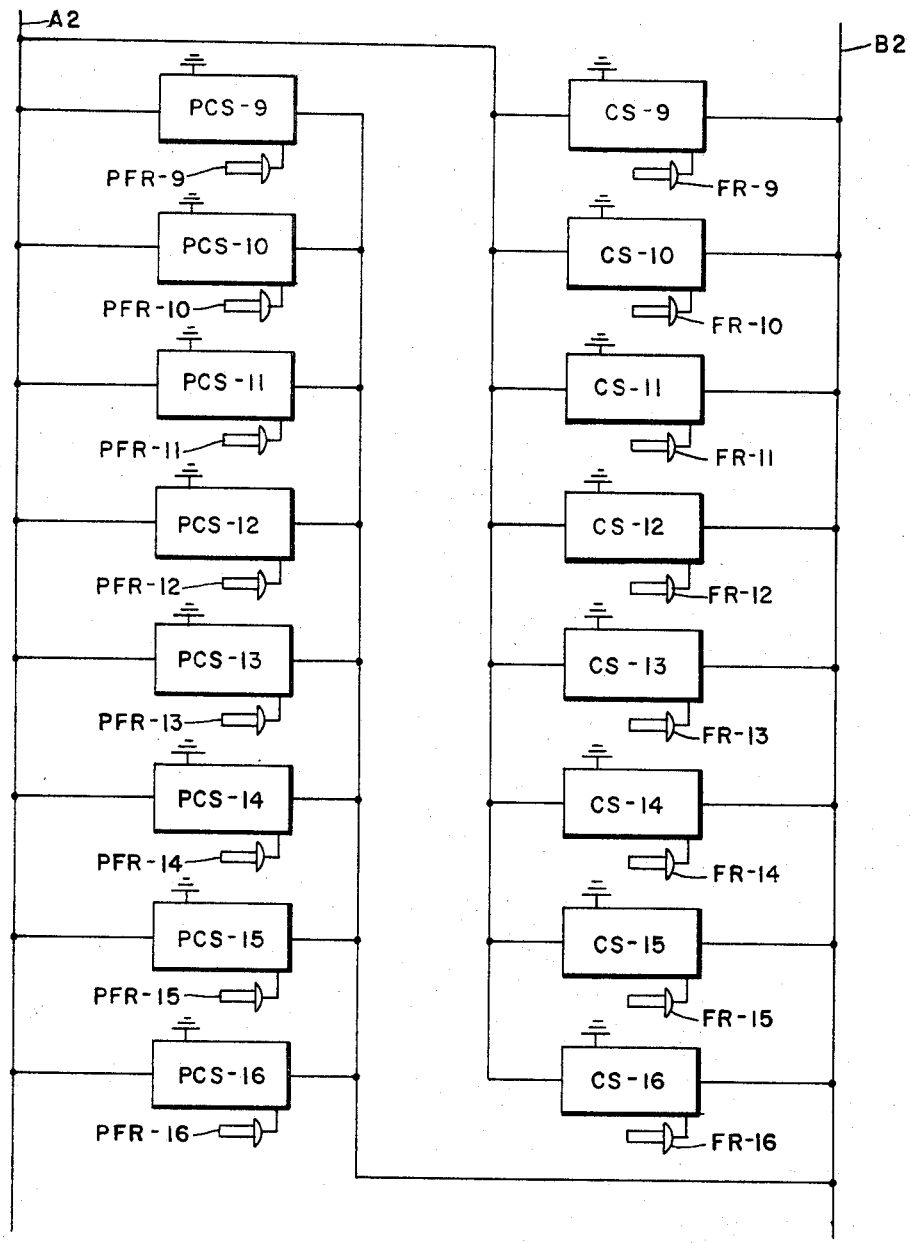

FIGURE 2 shows the three units, FIGURES 3 and 4 show more detail of unit 70a, while FIGURE 5 shows bank 20 in still greater detail.

As can be seen from FIGURE 3, oven structure 70 is enclosed within insulated walls 72 with suitable scaffolding 74 outside of walls 72 to support the associated blowers and ducts and with internal structural members to support tracks 68. Units 70a, 70b and 70c are located one above the other and may each be on a separate floor of the building which houses them.

Access doors 76 are provided in the walls.

Fresh air is supplied by blowers 80a, 80b and 80c and warm air and volatiles are exhausted by exhaust fans 82a, 82b and 82c which are attached to units 70a, 70b and 70c, respectively.

As can be seen in FIGURES 3 and 4, blowers 80a, 80b and 80c supply air through riser 83 to horizontal inlet ducts 84 below each bank, the outlets 86 of which direct the air upward between the web and each bank, providing a continuous curtain 88 of cool fresh air between the web and the banks on each side.

Above each bank is an inlet 90 to an exhaust duct 92, connected through vertical riser 94 and exhaust pipe 96 to exhaust fan 82a, 82b or 82c so that warm air is withdrawn at the top of each bank. Suitable dampers 100 (FIGURE 4) regulate the air flow in and out.

In the practical application of this invention, it has been found preferable to operate the blowers 80a, 80b and 80c and exhaust fans 82a, 82b and 82c only in the event of stoppage of web movement while the oven is in operation.

As shown in FIGURE 5, each bank can be moved on rollers 66 along track 68 from the operative position shown to a retracted position in which the radiant face is at line 102, (or moved to points between the two positions) by means of suitable, automatic mechanism such as chain 104 riding on sprocket 106 and attached to facing carriages 64 at points 108 and 109. A reversing drive (described later) causes points 108 and 109 to move back and forth in opposite directions thus moving the facing banks toward or away from the web within the desired limits.

The temperature of the web is measured as it passes a fixed point 111 (between zones 9 and 10, FIGURE 5), by radiometer 110 which sights the web through tube 112 and actuates a controller shown in the circuit diagram (FIGURES 17D–1, 17D–2 and 17D–3), to vary the high and low fire settings of the generator banks 15 and 16 to reduce or increase the heat on the web as required to maintain the desired web temperature. In one practical form the web temperature is maintained at any selected temperature within the range of 250° F. to 280° F. within ± 4° F. In some cases it is desirable to locate radiometer 110 above zone 10 to sense the final (maximum) web temperature.

In case of stoppage of the web it is desirable to reduce the heat to a very low value, very rapidly. This may be accomplished by retracting the generators to line 102 and/or interposing a curtain 116 between generators 63 and web 60 and/or starting blowers 80a, 80b and 80c and fans 82a, 82b and 82c. The curtain which is carried by chains 118 riding on sprockets 120 is movable from a retracted position 116a, where it is not in front of the infrared generators, to a position 116b where it is between the web and the faces of the generators so as to cut off radiation to the web within a few seconds.

Figure 17G:
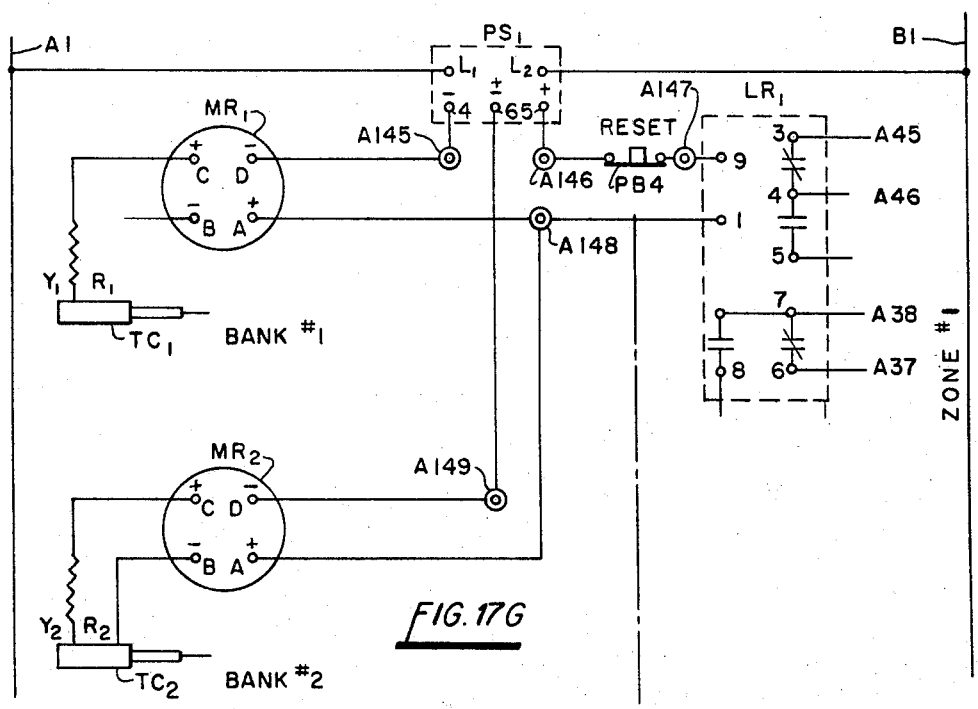
Figures 3, 17E:
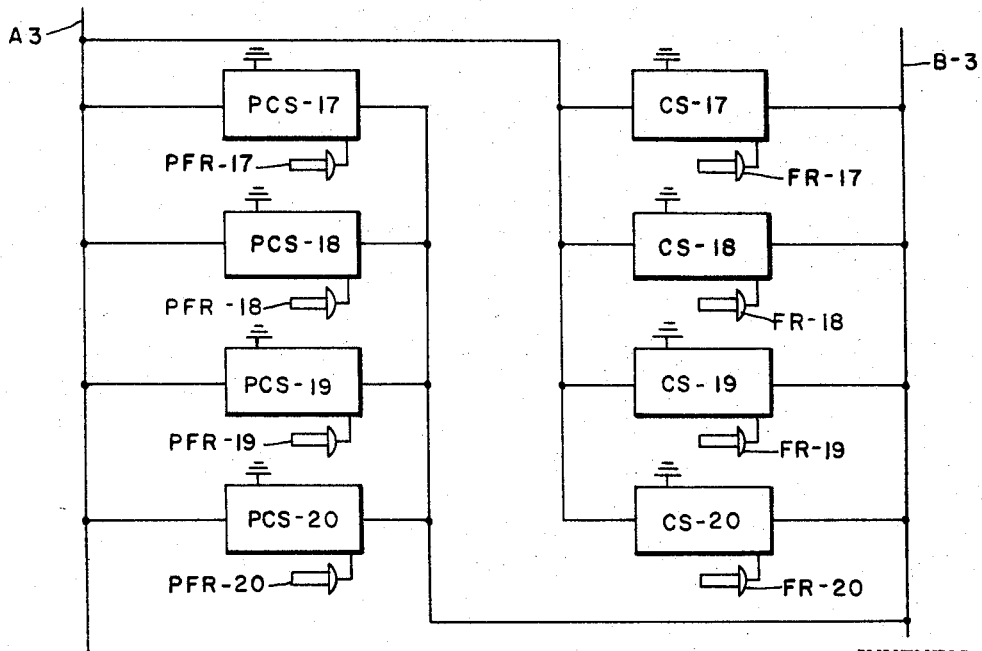
Figures 2, 17F:
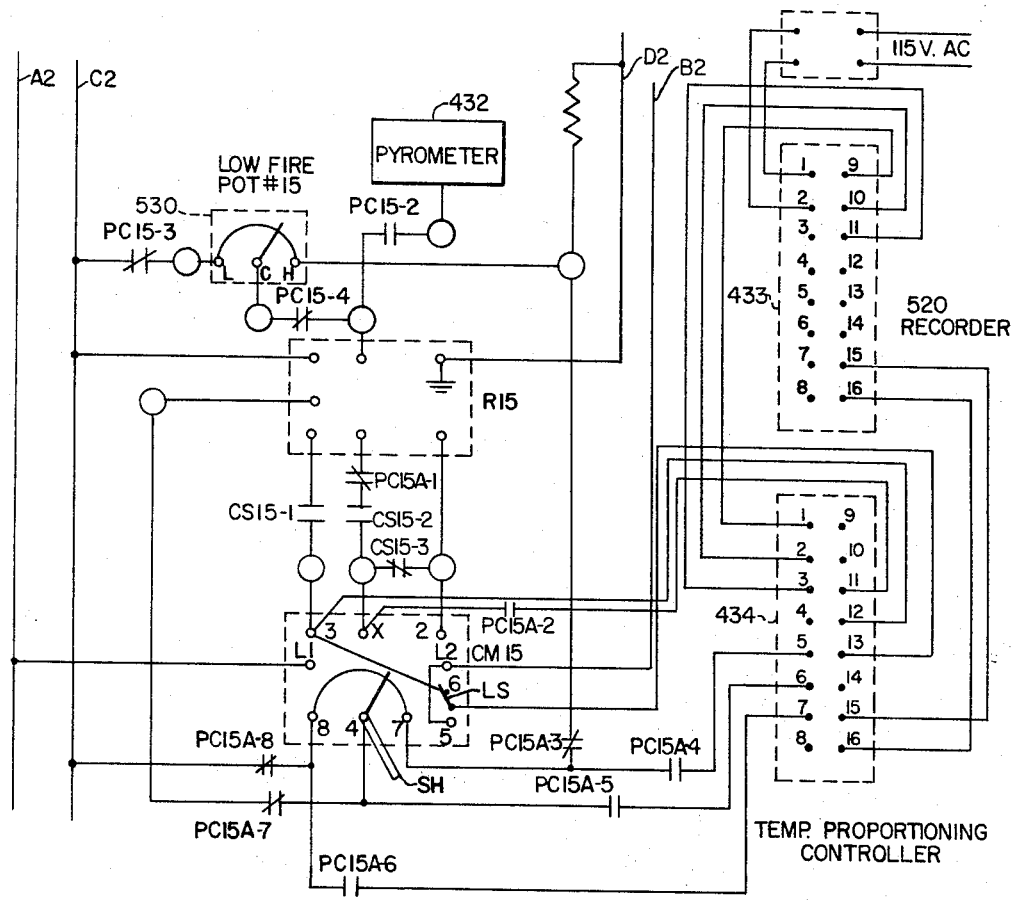
Figure 17H:
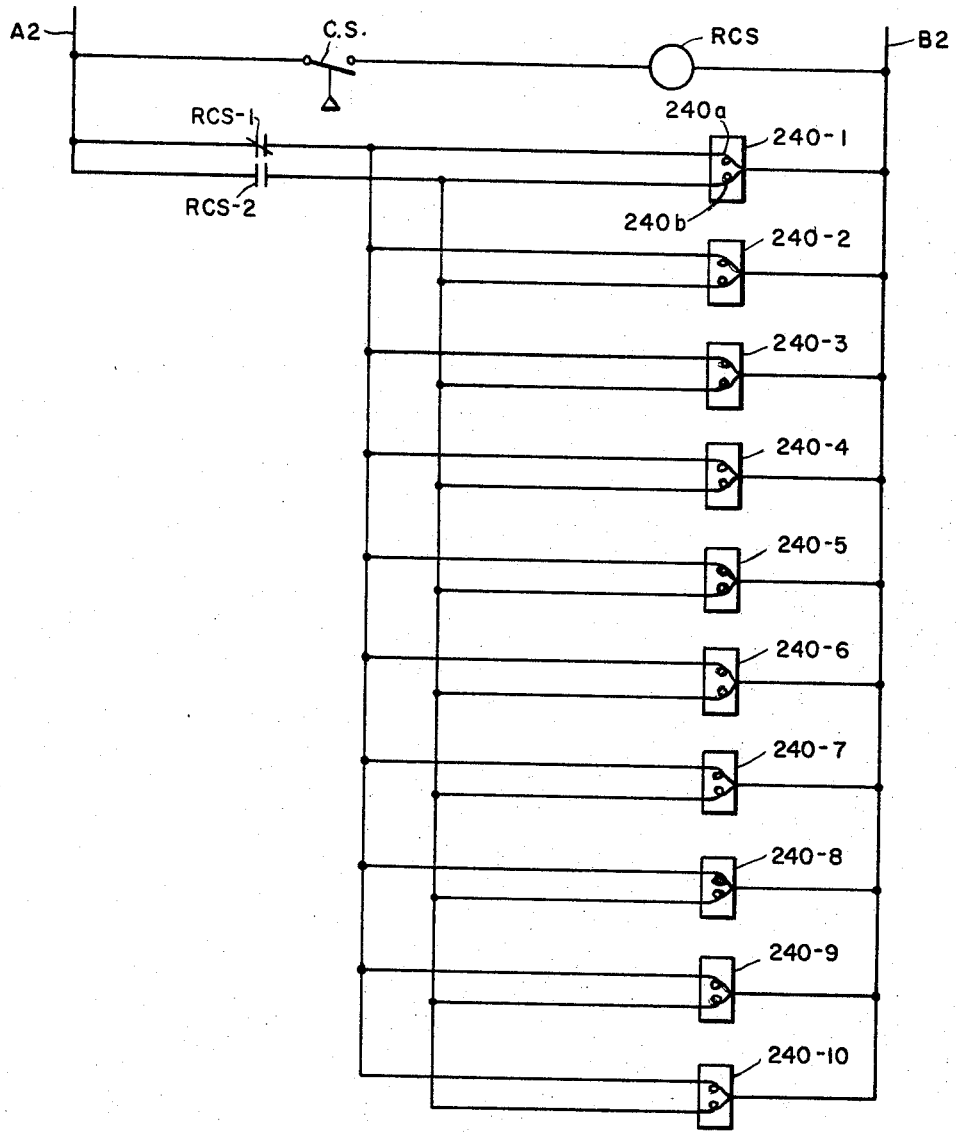

Movement of curtain 116 is obtained by a reversible drive controlled by movement of the web under control of the circuit of FIGURE 17H and/or by manual emergency shut off.

Figure 9:
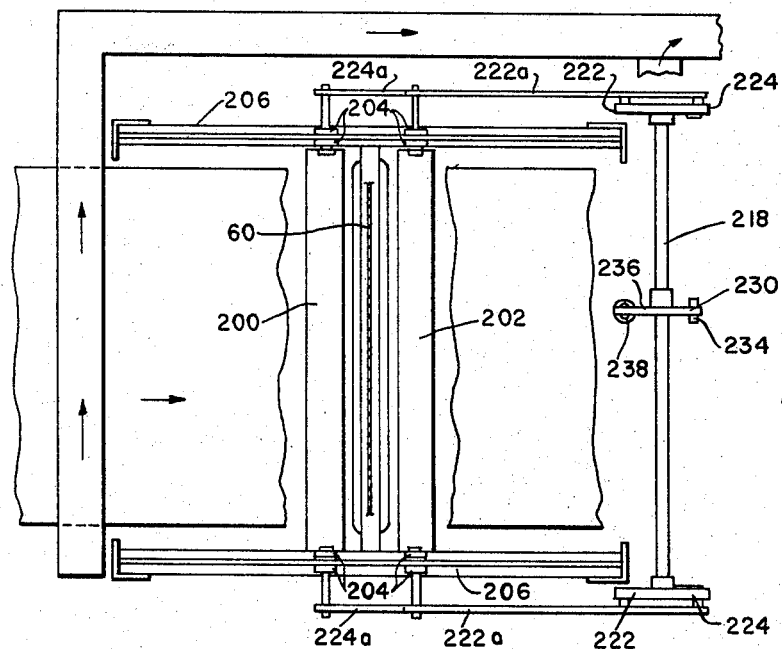
FIGURE 9 is a horizontal top section of the FIGURE 8 modification looking from line 9—9 of FIGURE 8.
Figure 8:
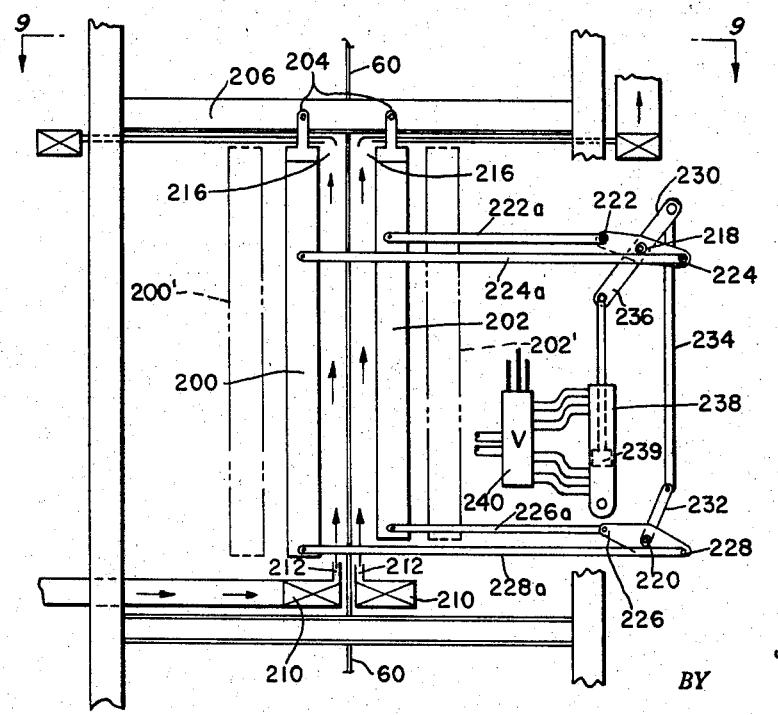
FIGURE 8 is a side view of a modification of the generator bank shifting structure shown in FIGURE 3.

FIGURES 8 and 9 show an alternative and preferred means for moving the infrared generators rapidly from operating position to a location remote from the web, wherein web 60 travels upward between generator banks 200 and 202 which are suspended from above on rollers 204 which roll on tracks 206.

Banks 200 and 202 may be used in the previously described units in place of banks 62.

Air is supplied between the web and each bank through ducts 210 and slots 212, so that the air travels upwardly in sheets between the web and the radiant generator bank. The heated air is withdrawn through slots 216 at the top of the heat zone. As in the previous embodiments this may be either continuous while the oven is operating or only when the web has stopped.

Parallel shafts 218 and 220 are journalled for rotation at points in vertical alignment (see FIGURE 8) opposite the upper and lower portions of the generator banks. Attached to the shafts are oppositely extending crank arms. Shaft 218 has arms 222 and 224, while shaft 220 has arms 226 and 228, which are connected to bank 202 by rods 222a and 226a respectively, and to bank 200 by rods 224a and 228a respectively.

Shaft 218 also has a crank 230 and shaft 220 has a crank 232, cranks 230 and 232 being connected by a connecting rod 234 so that when one shaft is oscillated, the other oscillates in unison with it and the banks 200 and 202 roll on rollers 204 in opposite directions from the full line position to the broken line positions indicated at 200′ and 202′.

Attached to shaft 218 is another crank arm 236 connected to the piston of a fluid (pneumatic or hydraulic) cylinder 238.

By controlling flow of fluid to either end of the cylinder, the shaft can be oscillated and the banks moved back and forth very rapidly, making use of an opaque curtain between the generators and the web unnecessary in certain applications, particularly when the heat is reduced simultaneously with outward movement of the generators.

Solenoid valve 240 is electrically controlled as indicated in FIGURE 17H to alternatively admit fluid to and exhaust fluid from opposite ends of cylinder 238 to cause piston 239 to move from one end to the other so that banks 200 and 202 are adjacent to web 60 when it is to be heated and move away from the web when heat is to be cut off.

Figure 10:
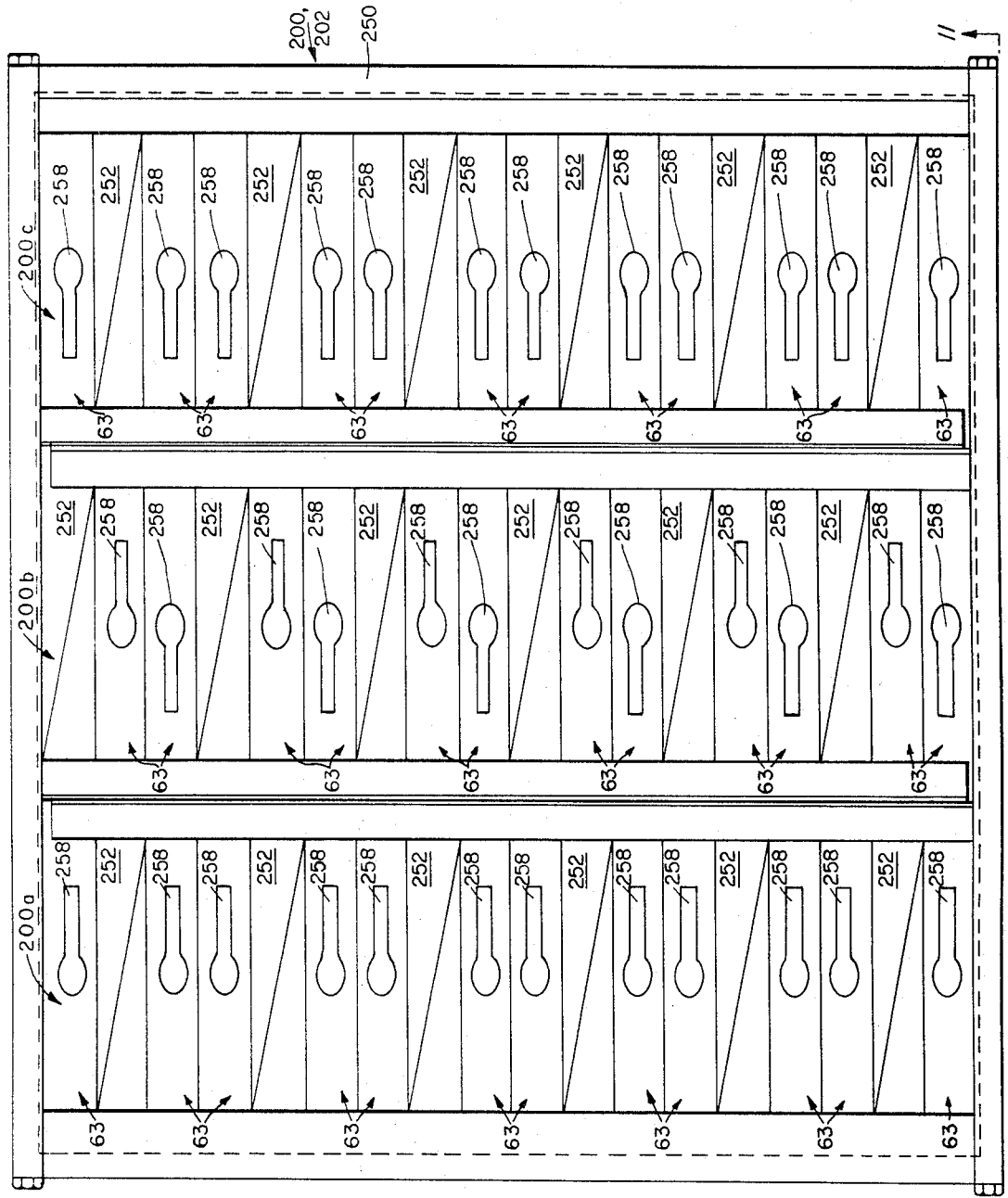
FIGURE 10 is a rear view of a typical one of the twenty infrared banks used in the structure shown in FIGURE 8.

The detailed structure of typical burner banks 200 and 202 is shown in FIGURES 10–15. Each comprises a frame 250 (FIGURE 10) having a plurality of infrared generators 63 arranged in three rows 200a, 200b and 200c, with the generators in each row arranged in pairs with reflectors 252 between pairs to spread the total radiation over a greater surface at less intensity than if the generators were continuous. Generators in alternate rows are staggered as indicated in FIGURE 10 to facilitate transfer of flame from one to the other during ignition.

Manifold 254 (FIGURES 11, 13 and 14) distributes the premixed combustible gaseous mixture to the generators through flexible connectors 256 and goose neck ducts 258 (FIGURES 10 and 11).

As can be seen in FIGURE 14, the mixture is supplied to manifold 254 from supply conduit 260 which has a valve 261 and a branch 262 which supplies gas to a flame prover burner 264. An independent gas line 266 supplies combustible mixture to pilot burner 268 at a corner of frame 250 diagonally opposite to burner 264.

Figures 13, 15:
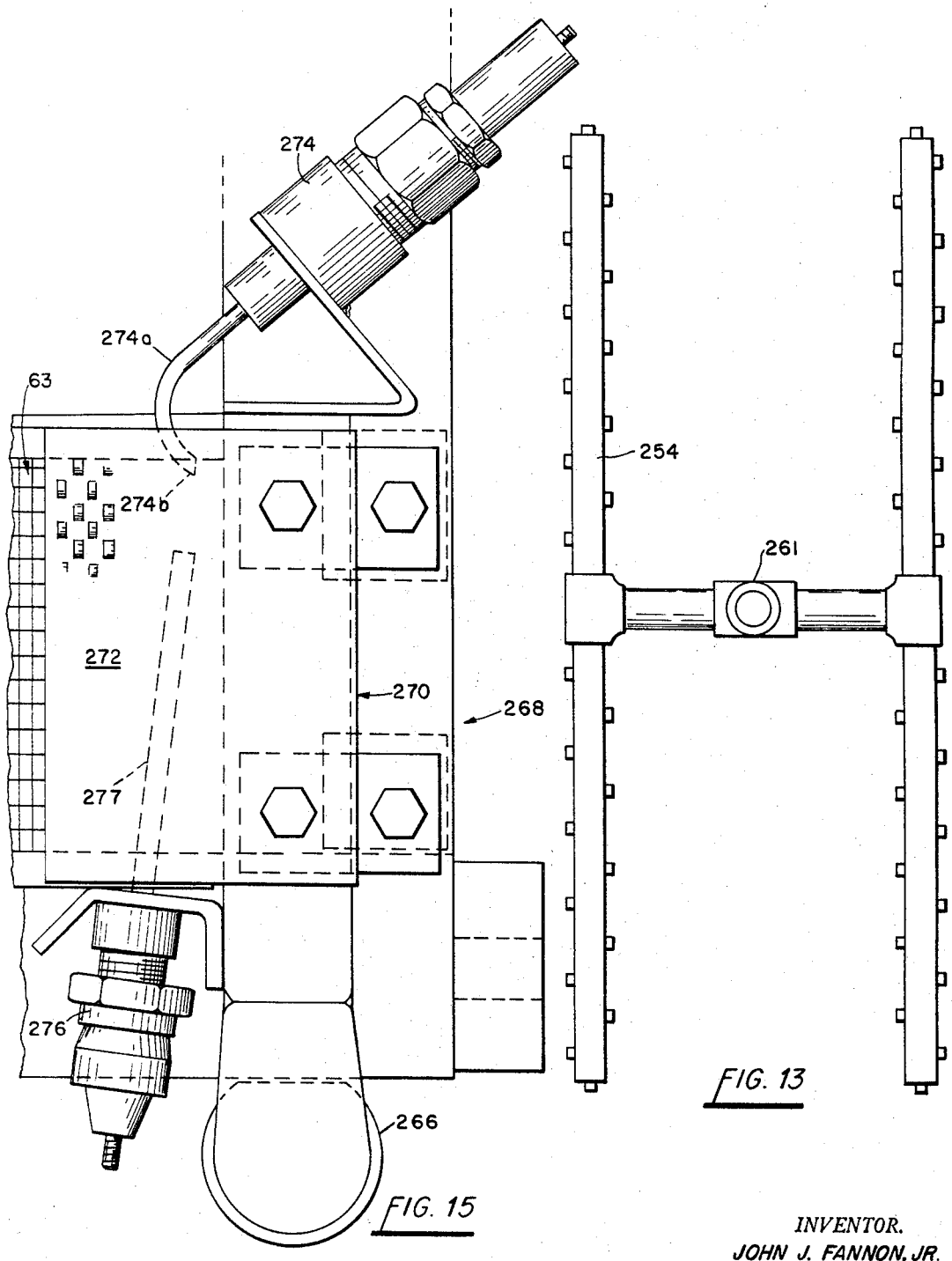
FIGURE 13 is a view of the gas manifold structure of the bank of FIGURE 10 looking from line 13—13 of FIGURE 11.
FIGURE 15 is an assembly view of the typical ignition pilot indicated in the lower left corner of FIGURE 14.

FIGURE 15 shows the structure of pilot burner 268 which comprises burner tube 270, combustion space 272, spark plug 274 and flame prover 276. Spark plug 274 has an electrode 274a, with spark gap 274b, the spark jumping to burner tube 270, igniting gas flowing to pilot burner 268.

The burning gas at pilot burner 268 forms a conducting path through flame rod 277 incorporated into flame prover 276, and also ignites gas at the generators 63 which are arranged in a pattern such that flame travels from one to the other, lighting all generators almost simultaneously.

Flame prover burner 264 has the same structure as pilot burner 268, except that it does not incorporate a spark plug. When the generator adjacent to burner 264 is operating it will ignite gas flowing from burner 264. The flame at either burner 264 or burner 268 carries current to flow through the flame rod 277 which is incorporated into the burner actuating safety controls (FIGURES 17E-1, 2 and 3) as explained later. In FIGURES 17E-1, 2 and 3, the flame rods 277 associated with the pilot burners 268 of the twenty generator banks are designated PFR-1 to PFR-20 and the flame rods 277 associated with the flame prover burners 264 of the twenty generator banks are designated FR1-20.

By this arrangement, flame rods PFR1-20 provide signals indicating the pilot burners are operative and flame rods FR1-20 provide signals indicating that the associated generator banks are completely ignited and operative.

FIGURE 16 is a schematic diagram of the piping and controls supplying fuel and combustion air to unit 70a, incorporating zones 1 to 4 and generator banks 1 to 8.

As shown in FIGURE 16, gas flows in at conduit 300, passing successively through shutoff valve 302, pressure regulator 304, branch connection 306, pressure gauge 308, low pressure gas switch LGP-1, motor valve MV1, branch connection 310, high pressure gas switch HGP-1 and burner valve BV-1 to line 312 which connects to control valves CV1-CV8 which individually control the gas supply to the eight mixers CM1-CM8 of banks 1-8 of zones 1-4.

Branch connection 310 leads through vent valve VV1 to the atmosphere.

As is apparent from FIGURE 16A, each of the mixers CM1-CM8 comprises a mixing chamber 313 having an air inlet 313a, a gas inlet 313b, and a divergent mixture outlet 313c. The relative proportion of gas and air is controlled by actuation of associated ones of the positioning motors CM1-20 through the circuits illustrated in FIGURES 17F-1, 2 or 3. The motor CM has a rotatable output shaft 313d connected at 313f to link 131g which, in turn, is pivotally connected at 313h to the mixing chamber input cam lever 313i to position the shaft 313j thereby controlling the proportion of gas and air.

Air is supplied to banks 1-8 from blower 314 through line 316 (which incorporates cross 318 and pressure gauge 320) to mixers CM1-CM8 via inlets 313a where it is mixed with gas from line 312 via inlets 313b, the mixture then passing through outlets 313c to pipes 260 (see also FIGURE 14) with regulating valves 261 then through manifold 254, pipes 256 and goose necks 258 to the infrared generators 63.

Gas from branch connection 306 (FIGURE 16) goes through valve 326, pilot pressure regulator 328, pilot solenoid valve PV1 and regulating valve 330 to pilot mixer 332 where it is mixed with air from blower 314 flowing through cross 318, branch line 322 and butterfly regulating valve 334.

The pilot mixture from mixer 332 flows through line 336 to branch lines 266, each of which leads to one of the pilot burners 268.

As shown in FIGURE 14, a branch 262 carries part of the mixture from line 260 through valve 263 to flame prover burner 264.

Another unit having the same piping and control arrangement as that shown in FIGURE 16 is provided for zones 5-8, incorporating banks 9-16.

Another unit with the same piping and control arrangement as that shown in FIGURE 16 but with only two sets of components instead of four is provided for zones 9 and 10 incorporating banks 17-20.

*Electric circuits*

The electric control circuits are shown in block diagram form in FIGURE 17. FIGURES 17A-1 through 17H show schematically the controls and connections within each of the blocks shown in FIGURE 17.

With reference to FIGURES 2 and 17, zones 1-4, zones 5-8, and zones 9 and 10 are wired as three groups. The purge circuitry for zones 1-4, 5-8 and 9 and 10 are illustrated in FIGURES 17A-1, 2 and 3 respectively; their ignition circuitry is illustrated in FIGURES 17B-1, 2 and 3 respectively, their ignition proof circuitry in FIGURES 17C-1, 2 and 3 respectively, their program control circuitry in FIGURES 17D-1, 2 and 3 respectively; and their combustion safety circuitry in FIGURES 17E–1, 2 and 3 respectively. The circuits which control the firing rate of the generator banks in each zone, known as "Burner Control" circuits, are illustrated in FIGURES 17F–1 and 2. The circuit of FIGURES 17F–1 is applicable to zones 1–7, 9 and 10. The circuits of FIGURES 17F–2 and 17F–3 apply to the banks 15 and 16 respectively of zone 8. Each of the ten zones is equipped with a "Limit Control" circuit of the form shown in FIGURE 17G and there is a Generator Bank Retraction" circuit of the form of FIGURE 17H common to all ten zones which is effective to shut down and retract the burner banks in the event of stoppage of web feed.

As shown in FIGURE 17, power is supplied through lines L1 and L2 at 550 volts to the motors driving blowers 80a, 80b and 80c (FIGURE 2) and exhaust fans 82a, 82b and 82c (FIGURE 2) and to transformers T1, T2 and T3 (FIGURE 17) which supply power from their secondary windings at 110 volts to three groups of one control circuit through lines A1 and B1 controlling the first group which incorporates zones 1–4; through lines A2 and B2, controlling the second group which incorporates zones 5–8; and through lines A3 and B3 controlling tde third group which incorporates zones 9 and 10.

Banks 15 and 16 are operated constantly when the oven is in use. Additional banks are turned on or off manually as required to provide sufficient heat for the desired web speed. Thus, the total heat to the web may be controlled by operation of as many units as are required to reach the desired web temperature range and automatic adjustment of banks 15 and 16 in response to temperature variations as measured at optical pyrometer 110 (FIGURES 17D–1, 2 and 3) which controls the program controllers 426, 526 and 626.

When the unit is started from a cold condition, the following sequence of operations takes place:

(a) The oven is purged;
(b) The pilot burners for the required number of burner banks are ignited and their ignition proved;
(c) The required number of burner banks to maintain the desired temperature at the desired operating speed are ignited at high fire setting while in a position remote from the web;
(d) These banks are then moved close to the web and their input is cut to a predetermined operating rate;
(e) The optical pyrometer control cuts down the fuel supply to banks 15 and 16 to maintain the desired web temperature. If this temperature cannot be obtained by adjustment of input to banks 15 and 16, the operator turns other banks on or off as required.

To start the system into operation, all three of the exhaust fans 82a, 82b and 82c (FIGURE 2) must be in operation to purge the system of any combustible gas accumulation.

The air movement closes air flow switches AFS–1 to 9 in lines 400, 500 and 600 (FIGURES 17A–1, 17A–2 and 17A–3) in the three control circuits. The starters for the exhaust fan motors close additional contacts EFC–1 to 9 in series with the air flow switches in lines 400, 500 and 600 (FIGURES 17A–1, 2 and 3). If the air flow switches AFS–1 to 9 and the starter contacts EFC–1 to 9 in each of the circuits 400, 500 and 600 are closed, relay coils 1ACR1, 1BCR1 and 1CCR1 are energized.

When relay 1ACR1 is energized, it closes its contact 1ACR1–1 in line 402, after which time 1ATR–1 can be started by depressing start button PB1, completing a circuit which energizes relay 1ACR2, lights the purging light, and closes holding-contact 1ATR1–1 around the start button.

When sufficient time to purge the oven has elapsed, timer 1ATR1 times out, opening its closed contacts and closing its open contact, thus stopping the timer, cutting off the purging light and energizing line 404 as far as normally open contact ASS–2. If the blowers 80a, b and c and fans 82a, b and c are not to be operated during web movement, they are shutoff at the end of this purge cycle by suitable circuitry not shown.

Line 408 (FIGURE 17A–1) connects line A1 to line B1 through safe start circuit relays ATD and ASS and normally closed contacts PCS1–4 through PCS8–4 and CS1–4 through CS18 of the combustion safety controls PCS1–PCS8 and CS1–CS8 generally shown in FIGURE 17E–1. These controls are actuated by flame rods PFR1–PFR8 and FR1–FR8 respectively, one of which is shown at 276 in FIGURE 15. Flame rods PFR1–PFR8 are the flame rods subjected to the pilot flames at pilot burners 268, one at each burner bank, while flame rods FR1–FR8 are the flame rods subjected to flame prover burners 264 at each burner bank.

When the circuit A1–B1 is energized, if all these rods are cold, indicating no combustion at any burner or pilot burner, all contacts will be closed in the safe start circuit line 408 (FIGURE 17A–1), completing a circuit through the master control (which may be Barber-Colman unit 1490–1), energizing time delay coil ATD which will close its cnotact ATD–1, thus energizing safe start relay ASS, which then closes its holding contact ASS–1, and its contact ASS–2 in line 404, the latter completing a circuit from line A1 to line B1 through motor starter coil 406.

Energization of coil 406 causes combustion blower 314 (FIGURE 16) to operate.

The circuits in FIGURES 17A–2 and 17A–3 operate in identical manner.

As shown in FIGURE 17B–1, line 410 incorporates, in series, a pilot ignition momentary contact switch 412, a normally open contact 1ACB (which will be closed when the web is up to speed due to energization of relay RCS) (FIGURE 17H) (as described presently), low gas pressure cutoff LGP1, high gas pressure cutoff HGP1, air flow switch AFS–10 in the combustion air duct and relay coil 1ACR3.

When these controls close their contacts, relay 1ACR–3 (FIGURE 17B–1) is energized, closing contact 1ACR3–1 in line 414 which energizes timers 1ATR2 and 1ATR3, pilot gas valve PV1, and the ignition transformers, causing sparks at the spark plugs and ignition of the pilot burners. Energization of timer 1ATR2 closes holding contact 1ATR2–1 around pilot ignition button 412 keeping 1ACR3 energized after button 412 is released.

It also closes contact 1ATR2–2 (FIGURE 17C–1) which energizes coil 1ACR4 in line 422 which then closes its contact 1ACR4–1 in another holding circuit around button 412.

If ignition occurs at all pilot burners before timer 1ATR2 times out, pilot flame rods PFR1–PFR8 (FIGURE 17E–1) (one of which is shown at 276 in FIGURE 15) will conduct current through the flame and close normally open contacts PCS1–5 to PCS8–5 in line 416 (FIGURE 17C–1) which will energize relay coil 1ACR6 which closes its contact 1ACR6–1 in series with now closed contact 1ACR4–1 (FIGURE 17B–1) around button 412 thus keeping relay coil 1ACR–3 energized after timer 1ATR–2 times out.

The relay contacts PC1–5 to PC8–5 in line 418 are provided to permit selective shorting of the flame rod circuit contacts of relays PCS1–5 to PCS8–5 (FIGURE 17C–1) respectively by program control 426 (FIGURE 17D–1) on any of the burners 1 to 8 which are not to be operated.

If ignition of all pilots for all banks which are to be operated does not occur before timer 1ATR2 (FIGURE 17B–1) times out, contact 1ATR2–1 will open before contacts 1ACR4–1 and 1ACR6–1 close, breaking the circuit to relay 1ACR3 which opens its contact 1ACR3–1 in line 414 which would shut off the ignition and close pilot valve PV1.

Warning timer 1ATR3 times out ahead of timer 1ATR2, whereupon it closes its contact 1ATR3–1 (FIGURE 17C–1) in line 420 which then energizes relay 1ACR5

(FIGURE 17C–1) which closes its contacts 1ACR5–1 and 1ACR5–2 (FIGURE 17C–1) in separate 6.3 volt alarm circuits (not fully shown) causing a warning light to be energized, and/or an alarm to be sounded.

In order not to shut the machine down if one pilot safety circuit is not functioning properly, valves 268 (FIGURE 16) in the pilot lines may be replaced with solenoid valves, wired so that any valve may be closed from the control panel, locking out the corresponding burner valve and combustion safeguard, thus cutting off the burner with inoperative pilot but allowing the other burners to be operated.

Switches PC1–5 to PC20–5 (FIGURES 17C–1 to 3) are located on the operating panel. When the unit is started, if one of the pilot burners fails to light, the warning signal sounds, whereupon the operator closes the corresponding switch of group PC1–5 to PC20–5, shorting out the burner and preventing shut down of the entire unit.

Energization of relay 1ACR6 in addition to causing contact 1ACR6–1 (FIGURE 17B–1) to close, also closes its contact 1ACR6–2 (FIGURE 17C–1) in line 424 and opens contact 1ACR6–3 (FIGURE 17B–1) in the ignition circuit (shutting off ignition sparks) and 1ACR6–4 (FIGURE 17C–1) in line 420 which deenergizes relay 1ACR5, shutting off the alarm circuit.

Closing of contact 1ACR6–2 (FIGURE 17C–1) in line 424 energizes vent valve VV1 (causing it to close) and main valve MV1 (FIGURES 16 and 17C–1) (causing it to open), whereupon its auxiliary contact MV1–1 closes which energizes and opens blocking valve BV1 (FIGURES 16 and 17C–1), admitting gas to line 312 (FIGURE 16) which connects to the individual burner valves.

The circuits shown in FIGURES 17B–2, 17B–3, 17C–2 and 17C–3 operate in identical manner to the circuits just described, shown in 17B–1 and 17C–1.

FIGURES 17D–1, 17D–2 and 17D–3 show circuits connecting the program controls 426, 526 and 626 to electric control valves CV1–CV20 which control gas flow to each of the generator banks 1–20 (see FIGURE 16). Program controller 526 responds to radiometer 110 (FIGURES 5 and 17D–2) to automatically regulate the high fire setting of banks 15 and 16 as explained later in reference to FIGURES 17F–2 and 17F–3. Otherwise the program controls 426, 526 and 626 are manually set to open the ones of the control valves CV–1 to CV–20 associated with the ones of the banks 1–20 which are to be operated.

Where burners are to be maintained shut off by the program controllers, lines to the control valves CV1 to CV20 are deenergized by opening of connections between line A–1 and the appropriate ones of the terminals A–31, A–33, A–35, A–37, A–39, A–41, A–43 and A–45 of the program controller 426 (FIGURE 17D–1) and like connections in controllers 526 and 626 in FIGURES 17D–2 and 17D–3. In addition, coresponding normally open contacts PC1–5 to PC20–5 in lines 418 (FIGURE 17C–1), 518 (FIGURE 17C–2) and 618 (FIGURE 17C–3) are closed by the controller to short out the appropriate ones of the contacts PCS1–5 to PCS20–5 controlled by flame rods of the non-operating pilot burners.

Where burners are to be operated on high or low fire, the program control opens and closes contacts 1 to 4 of PC1 to PC20 in the control motor circuits for the mixers shown in FIGURES 17F–1, 17F–2, and 17F–3.

In each line to one of valves CV1 to CV8 (FIGURE 17D–1) is a normally closed contact (HTL1 to HTL8, respectively) which opens if the radiants, in the zone controlled by the valve, exceed the maximum permissible operating temperature, as explained later.

The controls shown in FIGURES 17D–2 and 17D–3 operate in the same manner as those just described for FIGURE 17D–1.

FIGURES 17E–1, 17E–2, and 17E–3 show the pilot combustion safety controls PCS1–PCS20 and the main burner combustion safety controls CS1–CS20, with connections to power lines, flame rods (PFR1–PFR20 and FR1–FR20) and to ground. The circuits incorporating the contacts actuated by these controls are shown in FIGURES 17A–1, 17A–2, 17A–3, 17C–1, 17C–2, 17C–3, 17F–1 and 17F–2.

FIGURE 17F–1 shows the circuits for the control motor of mixer CM1, which is regulated by high fire potentiometer 428 and low fire potentiometer 430.

The potentiometers are manually adjustable to give desired high fire and low fire mixtures. When contacts PC1–1 and PC1–2 are closed and contacts PC1–3 and PC1–4 are open, the control motor of the associated mixer CM1 is positioned in accordance with the setting of high fire potentiometer 428.

When contacts PC1–1 and PC1–2 are open and PC1–3 and PC1–4 are closed, as shown in FIGURE 17F–1, the control motor of the mixer CM1 is positioned in accordance with the setting of low fire potentiometer 430.

Combustion safety control CS1 (FIGURE 17E–1) has normally open contacts CS1–1 and CS1–2 and normally closed contacts CS1–3 (FIGURE 17F–1). In this condition mixture control CM1 at lighting fire setting, provides a rich starting mixture.

When the flame rod FR1 (FIGURE 17E–1) senses the presence of flame, CS1–1 and CS1–2 close and CS1–3 (FIGURE 17F–1) opens causing the control motor of mixer CM1 to move from lighting fire setting to either its high fire or its low fire setting depending on whether PC1–1 and PC1–2 or PC1–3 and PC1–4 are closed by the program controller. If the setting of PC1 is changed, from high fire to low fire, for example, the control motor for mixer CM1 will operate until the arm of the potentiometer associated therewith moves to a position to balance the setting of the low fire potentiometer 430 as applied to the terminals S–2 and S–1 of R1 (FIGURE 17F–1).

The controls of the mixers CM1–CM14 and CM17 to CM20 in zones 1–7, 9 and 10 (FIGURE 2) are identical. Mixer CM1 shown in FIGURE 17F–1 controls bank 1 in zone 1. Banks 2–14 and 17–20 are controlled in the same manner by identical circuits.

The mixer controls of banks 15 and 16 in zone 8 differ from those in the other zones. Bank 15 is controlled by the circuit shown in FIGURE 17F–2 and bank 16 is controlled concomitantly in the same manner illustrated in FIGURE 17F–3. The circuit of FIGURE 17F–3 is the same as the circuit for bank 1 shown in FIGURE 17F–1, except that high fire potentiometer 632 thereof is positioned by the shaft SH of the control motor of mixer CM15 (FIGURE 16A) to maintain the setting of banks 15 and 16 the same as determined by pyrometer 432 (FIGURE 17F–2).

As is shown in FIGURE 17F–2, connected to the control motor for the mixer CM15 for the bank 15 is a General Electric Company automatic control 433 which regulates to control motor or mixer CM15 to provide the web temperature for which the pyrometer 432 is set. A General Electric Company Model 520 recorder 434 records the web temperature.

This controller 433 moves limit switch LS between contacts 5 and 6 of mixer CM15 to its control motor to increase or decrease heat to banks 15 and 16.

The control motor for mixer CM15 is connected by shaft SH with the potentiometer 632 which regulates the control motor for mixer CM16 at its high fire setting so that bank 16 is always in step with bank 15. Relay PCS15 moves the banks in when the web is moving, out when the web is stationary. Relay PC15A is energized if PCS15 is energized and banks 15 and 16 are lit.

As shown in FIGURES 17D–1, 17D–2 and 17D–3, the mixture lines to individual banks incorporate limit switches HTL1–HTL20 which deenergize the respective mixture valves when the switch contacts are open.

FIGURE 17G shows the radiant temperature limit control for zone 1 with thermocouple TC1 sensing the temperature of the radiants in bank 1, and thermocouple TC2 the temperature of the radiants in bank 2.

These thermocouples actuate combination meter-relays MR1 and MR2 respectively which indicate the thermocouple temperature until one of them reaches the maximum permissible value when it operates limit relay LR1, opening its closed contacts and closing its open contacts, thus opening contacts HTL1 and HTL2 in FIGURE 17D–1, causing control valves CV1 and CV2 to close, shutting down both banks in zone 1.

When the thermocouple temperature has dropped below the maximum, pushbutton PB4 (FIGURE 17G) may be pressed, breaking the circuit to relay LR1 and restoring its contacts to their normal condition thus closing contact HTL1 and HTL2 and reopening valves CV1 and CV2.

All of the other zones 2–10 have limit controls operating in the same manner as those shown in FIGURE 17G.

If the web stops for any reason, blowers 80a, 80b and 80c and exhausts 82a, 82b and 82c are immediately started (if they are not already running) and maintained operative until the burners have cooled off. In addition, fuel is cut off from all burners and all burners are moved to retracted position.

FIGURE 17H shows the control for retracting the burner banks in case of stoppage of the web.

Centrifugal switch C,S, is normally open but closes when the web drive is up to speed. When switch C,S, is closed, relay RCS is energized and closes contacts 1ACB, 1BCB and 1CCB in lines 410, 510 and 610 (FIGURES 17B–1, 17B–2 and 17B–3) respectively, permitting the burners to be lighted.

Relay RCS also controls valves (240–1)–(240–10) one of which is shown in FIGURE 8. These valves control flow of fluid to cylinders (238–1)–(238–10) respectively which have pistons which move the burner banks from positions adjacent to the web to positions remote from the web.

Each of the valves 240 has two control windings 240a and 240b which may be alternately energized to move the piston to opposite ends of cylinder 238, so that when winding 240a is energized and 240b deenergized the banks will be remote from the web and when 240b is energized and 240a deenergized the banks will be positioned near the web.

Instead of controlling a fluid driven piston, windings 240a and 240b may be windings in an electric motor drive for the mechanism shown in FIGURE 5 to move chain 104 and curtain 116 from one position, where the burner bank is retracted and curtain 116 is in position 116b between the bank and the web, to another position where the burner bank is close to the web and curtain 116 is in position 116a.

Winding 240a in each zone is connected across lines A2–B2 through normally closed contact RCS1 while winding 240b is connected through normally open contact RCS2, so that when the web is below operating speed, coils 240a in every zone will be energized and the banks will be remote from the web; while when the web is up to speed, contact CS will be closed and coil RCS will be energized, opening RCS1 and closing RCS2 thus deenergizing coil 240a and energizing coil 240b in every zone, causing the piston to move the banks close to the web.

If the web stops, centrifugal switch CS will open, deenergizing relay RCS, which will shut off all infrared generators. Deenergization of relay RCS (FIGURE 17H) is effective to shut off all burners as follows: deenergization of relay RCS (FIGURE 17H) opens its contacts 1ACB, 1BCB and 1CCB (FIGURES 17B–1, 2 and 3) deenergizing relays 1ACR3, 1BCR3, and 1CCR3; this by opening contacts 1ACR3–1, 1BCR3–1 and 1CCR3–1 deenergizes the coils of pilot gas valves PV1, PV2 and PV3 and terminating gas supply to the pilot burners; this by removing the flame from pilot flame rods PFR1–20 (FIGURES 17E–1, 2 and 3) actuates pilot safety controls PCS1–20 (FIGURES 17E–1, 2 and 3) to open all of the number 5 contacts (FIGURES 17C–1, 2 and 3) to deenergize relays 1ACR6, 1BCR6, 1CCR6 and open contacts 1ACR6–2, 1BCR6–2 and 1CCR6 thereby deenergizing the coils for vent valves $VV_1$, $VV_2$ and $VV_3$; main gas valves $MV_1$, $MV_2$ and $MV_3$ and blocking valves BV1, BV2 and BV3.

In addition by reversing the contacts RCS–1 and RCS–2, deenergization of relay RCS (FIGURES 17H) will move all banks of generators away from the web. When the blowers 80a, b and c and fans 82a, b and c are not normally operative, contacts may be added to relay RCS to render them operative upon its deenergization.

The invention may be embodied in other specific forms without departing from the spirit or essential characteristics thereof. The present embodiments are therefore to be considered in all respects as illustrative and not retrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In an oven,
   means for moving a material to be irradiated along a predetermined path,
   means for irradiating said material with infrared radiation while moving along said path,
   said irradiating means comprises a bank of infrared generators all radiating in substantially one direction and mounted on a track transverse to said path for direct movement parallel to said radiating direction toward and away from said material,
   means for detecting whether or not said material is moving at a predetermined rate along said path, and
   means controlled by said detecting means including means for controlling the power input to said irradiating means for preventing said material from overheating due to such infrared radiation in the event the material's speed is less than said predetermined rate,
   said last named means including means for increasing the distance between said material and said irradiating means.
2. The combination defined in claim 1 wherein said bank is located beneath and suspended from said track.
3. The combination defined in claim 1 wherein said track is located beneath and supports said bank.
4. The combination defined in claim 1 including lever means for moving said bank toward and away from said path.
5. The combination defined in claim 1 including sprocket chain means.
6. The combination defined in claim 1 including reversible fluid motor means for moving said bank toward and away from said path.
7. The combination defined in claim 1 wherein said means for controlling the power input to said irradiating means comprises means for cutting off said power input.
8. The combination defined in claim 1 wherein said last named means includes means for subjecting said material to the influence of a cooling fluid.
9. The combination defined in claim 8 wherein said cooling fluid medium is a stream of air directed between said irradiating means and said material in the same direction of movement of said material in said path.
10. The combination defined in claim 1 wherein said last named means includes means for intercepting the radiation from said irradiating means between said irradiating means and said material.
11. The combination defined in claim 10 wherein said intercepting means is a shutter means movable between said irradiating means and said material.

12. The combination defined in claim 1 wherein said material is a web and wherein said irradiating means comprises a pair of banks of infrared generators disposed on opposite sides of said predetermined web path and oriented to direct radiation toward a web moving along in said path.

13. The combination defined in claim 12 wherein said predetermined web path is substantially vertical, wherein said infrared generator banks are roller mounted upon substantially horizontal tracks extending transversely of said predetermined path.

14. The combination defined in claim 13 wherein said generator banks are located beneath and suspended from said tracks.

15. The combination defined in claim 13 wherein said generator bank moving means includes an actuator pivotally mounted above an axis spaced from and parallel to said web predetermined path between first and second limit positions and connected to each of said pair of generator banks to move said generator banks along said tracks to positions adjacent said web predetermined path at one of its said limit positions and to positions remote from said web predetermined path at the other of its said limit positions.

16. The combination defined in claim 15 further comprising a reversible fluid motor operatively connected to pivot said pivoted actuator between its said limit positions.

17. The combination defined in claim 16 wherein said tracks are located beneath and support said generator banks.

18. The combination defined in claim 13 wherein said pair of generator banks are interconnected by a drive mechanism comprising a pair of sprockets rotatably mounted about horizontal axes parallel to the path of web movement and spaced therefrom on opposite sides thereof, a chain extending between and interconnecting said sprockets, means connecting said pair of generator banks to opposite runs of said chain between said sprockets, and means for driving said chain in one direction to separate said generator banks from said web and in the other direction to bring said generator banks toward said web.

19. In an oven,
means for moving a web along a predetermined path,
means for irradiating the web with infrared radiation while moving along said path,
means for detecting whether or not the web is moving at a predetermined rate along such path,
means controlled by said detecting means for preventing said web from overheating due to such infrared radiation in the event the web's speed is less than said predetermined rate, and
means for directing a stream of air along the surface of said web throughout the region in which it is subject to irradiation from said irradiating means,
said air stream directing means comprises a pair of opposed fluid nozzles having elongated openings extending transversely of the path of the web movement and disposed in spaced opposed relation along said predetermined web path at opposite ends of the region in which said web is subjected to the radiation from said irradiating means, and
means for introducing air through one of the said nozzles and exhausting air from the other of said nozzles to thereby create a stream of air along said web between said nozzles.

20. In an oven in which a normally moving volatile carrying web is subjected to the influence of a field of infrared radiation of an intensity sufficient to remove the volatiles but which would rapidly produce a deleterious effect on the web in the event of reduction of the speed of the web movement below its predetermined norm,
means for moving a web along a predetermined path at a substantially constant speed,
means for irradiating said web while moving along said path to an extent that the volatiles are substantially removed from said web,
said irradiating means comprises a plurality of pairs of gas-fired infrared generator banks, the banks of each such pair being disposed on opposite sides of said predetermined web path, and said pairs being spaced longitudinally of said path to define successive zones of irradiation of said web,
means operative in the event of reduction of the speed of said web below said constant speed for reducing the intensity of irradiation of said web to a level which will preclude an irradiation induced deleterious effect upon said web,
means for purging said oven of undesirable gases and volatiles, and
means for preventing ignition of said gas-fired infrared generator banks prior to complete purging of said oven by said purging means.

21. In an oven in which a normally moving volatile carrying web is subjected to the influence of a field of infrared radiation of an intensity sufficient to remove the volatiles but which would rapidly produce a deleterious effect on the web in the event of reduction of the speed of the web movement below its predetermined norm,
means for moving the web along a predetermined path at a substantially constant speed,
means for irradiating said web while moving along said path to an extent that the volatiles are substantially removed from said web,
said irradiating means comprises a plurality of pairs of gas-fired infrared generator banks, the banks of each such pair being disposed on opposite sides of said predetermined web path, and said pairs being spaced longitudinally of said path to define successive zones of irradiation of said web,
means operative in the event of reduction of the speed of said web below said constant speed for reducing the intensity of irradiation of said web to a level which will preclude an irradiation induced deleterious effect upon said web, and each of said generator banks has a pilot burner,
means for controlling a supply of fluid to said bank,
means for detecting the ignition of said pilot burner, and
means controlled by said ignition detecting means for preventing supply of fuel to said bank unless said pilot burner is ignited.

22. In an oven in which a normally moving volatile carrying web is subjected to the influence of a field of infrared radiation of an intensity sufficient to remove the volatiles but which would rapidly produce a deleterious effect on the web in the event of reduction of the speed of web movement below its predetermined norm,
means for moving the web along a predetermined path at a substantially constant speed,
means for irradiating said web while moving along said path to an extent that the volatiles are substantially removed from said web,
said irradiating means comprises a plurality of pairs of gas-fired infrared generator banks, the banks of each such pair being disposed on opposite sides of said predetermined web path, and said pairs being spaced longitudinally of said path to define successive zones of irradiation of said web,
means operative in the event of reduction of the speed of said web below said constant speed for reducing the intensity of the radiation of said web to a level which will preclude an irradiation induced deleterious effect upon said web, and
means for detecting the temperature of the web and means responsive to said web temperature detecting means for varying the firing rate of the gas-fired infrared generators of at least one of said zones to maintain the web temperature as selected by said web temperature detecting means substantially at a preselected constant value.

23. The oven defined in claim 22 wherein said web temperature detecting means is a radiometer.

References Cited

UNITED STATES PATENTS

| | | | |
|---|---|---|---|
| 2,409,431 | 10/1946 | Hess | 34—48 X |
| 2,532,032 | 11/1950 | Offen | 34—155 |
| 2,639,364 | 5/1953 | Doyle | 34—48 X |
| 2,669,031 | 2/1954 | Chase et al. | 34—155 |
| 2,807,096 | 9/1957 | Kullgren et al. | 34—155 X |
| 2,991,989 | 7/1961 | Martin | 263—3 |
| 3,086,763 | 4/1963 | Ruff et al. | 263—3 |
| 3,091,441 | 5/1963 | Kullgren et al. | 263—3 |
| 3,321,197 | 5/1967 | Parslow | 263—3 |

JOHN J. CAMBY, *Acting Primary Examiner.*